United States Patent [19]
Lee et al.

[11] Patent Number: 5,832,473
[45] Date of Patent: Nov. 3, 1998

[54] INFORMATION MANAGEMENT SYSTEM WITH USER DATA-BASED USER INTERFACE

[75] Inventors: Sonia Lee; Philippe R. Kahn, both of Scotts Valley; Gregor P. Freund, San Francisco, all of Calif.

[73] Assignee: Starfish Software, Inc., Scotts Valley, Calif.

[21] Appl. No.: 526,006

[22] Filed: Sep. 8, 1995

Related U.S. Application Data

[63] Continuation-in-part of Ser. No. 451,734, May 26, 1995, Pat. No. 5,682,524.

[51] Int. Cl.$^6$ ..................................................... G06F 17/30
[52] U.S. Cl. ................................................. 707/2; 707/102
[58] Field of Search ..................................... 395/615, 346, 395/60, 61; 707/2, 102

[56] References Cited

U.S. PATENT DOCUMENTS

| | | | |
|---|---|---|---|
| 5,051,898 | 9/1991 | Wright et al. | 395/118 |
| 5,233,687 | 8/1993 | Henderson, Jr. et al. | 395/344 |
| 5,276,679 | 1/1994 | McKay et al. | 395/358 |
| 5,412,774 | 5/1995 | Agrawal et al. | 395/340 |
| 5,416,901 | 5/1995 | Torres | 395/159 |
| 5,491,795 | 2/1996 | Beaudet et al. | 395/346 |
| 5,500,929 | 3/1996 | Dickinson | 395/356 |
| 5,517,605 | 5/1996 | Wolf | 395/615 |
| 5,546,528 | 8/1996 | Johnston | 395/159 |
| 5,574,845 | 11/1996 | Benson et al. | 395/118 |
| 5,603,034 | 2/1997 | Swanson | 395/701 |
| 5,630,125 | 5/1997 | Zellweger | 395/614 |
| 5,659,724 | 8/1997 | Borgida et al. | 395/603 |
| 5,664,063 | 9/1997 | Johnson et al. | 395/603 |
| 5,682,524 | 10/1997 | Freund et al. | 707/5 |

OTHER PUBLICATIONS

Schuler, Microsoft a marketing genious, Recordnet.com, Jan. 23, 1995, 2 pages.
First Looks: But What About Bob?, PC Magazine, Apr. 25, 1995, pp. 37 and 40.
Is Bob Really a Kidsworld?, PC Magazine, Jun. 13, 1995, p. 89.

*Primary Examiner*—Wayne Amsbury
*Attorney, Agent, or Firm*—John A. Smart

[57] ABSTRACT

Information Management System and methods providing an improved user interface (UI) are described. In particular, the present invention provides a specialized region of the user interface which comprises a world or "landscape" which is a core representation or view of the user's own data. To render the landscape with representations of the data most important to the user, the system, at runtime, actually examines the underlying data which has been stored by the user. The system then dynamically alters the user interface at runtime to include representations of information which is important to the user. In operation, the system presents an interface comprising a background bitmap and further comprises diverse objects which are "plugged into" the background. Each object which is plugged in is typically a completely separate object which represents particular user data which is of interest to a currently logged-on user. Multiple background bitmaps or landscapes are provided so that a user may select a preferred representation of his or her "world" (e.g., family), including selecting completely different landscape environments (e.g., office). The system automatically adapts the objects placed on the landscape for the particular background setting which the user has chosen. Based on the user's actual data, the system regenerates the appropriate objects which are plugged into the landscape for representing the user's own data.

37 Claims, 21 Drawing Sheets

INFORMATION MANAGEMENT SYSTEM WITH USER DATA-BASED USER INTERFACE

The present application is a continuation-in-part of application Ser. No. 08/451,734 filed on May 26, 1995, issued as U.S. Pat. No. 5,682,524, the disclosure of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and their interfaces, and more particularly to the presentation of information to one or more users, especially those who share a single computer system.

With the advent of the personal computer, the use of computer systems is becoming increasingly prevalent in everyday life. In the past, computers were often housed in highly restricted areas, with access limited to a few computer scientists and programmers. Today, however, computers can be seen on the desktops of most business professionals. Running software applications such as word processors and spreadsheets, for example, even the average business professional can realize substantial productivity gains. Besides the business environment, computers can also be found in wide use both at home and at school.

The typical user of a computer today has little or no training in the computer sciences or even in the basic use of a personal computer. In order to operate a computer effectively, however, he or she must overcome a steep learning curve, one requiring mastery of a number of commands and data formats. One approach to this problem is to spend hours laboring over often-cryptic user manuals—an unattractive option at best. Instead, most users usually abandon printed manuals in favor of trial-and-error learning.

To increase ease of use, designers of computer systems have labored for decades to create architectures which are intuitive. Most of this effort has been centered around the user interface or UI—the means by which a user communicates (i.e., supplies input and receives output) with a computer. With increasingly widespread availability of powerful microprocessors, graphical user interfaces (GUIs, pronounced "gooeys") have become feasible.

A GUI is a type of display format that enables a user to operate a computer by pointing to pictorial representations, such as "windows" and "icons" (bitmaps), displayed on a screen device. A window is a rectangle displayed on the screen that affords a user workspace within a program. In typical operation, the user may move the window about on the screen, change its size or shape, enlarge it to fill the screen, close it entirely, or change how much of its contents are displayed. To aid the user in the manipulation of its contents, a window will typically include a number of user interface components, such as buttons, menus, sliders, and the like. Outside the window, the screen can display other screen objects, such as other windows, disk drive icons, or even a trash can icon.

To navigate within a GUI, most systems employ a screen cursor or pointer, typically displayed as a small arrow icon (bitmap) which allows the user to select individual points on the screen. In operation, the screen cursor is moved to a desired screen location in response to movements of a pointing device (e.g., mouse) by the user. Besides effecting cursor movement, most pointing devices include one or more switches or "mouse buttons" for specifying additional user input or "user events." Since many user choices may be entered through use of a pointing device (e.g., for selecting screen objects), instead of input with a keyboard, the need for the user to memorize special commands has been lessened.

Most GUIs feature a menu bar. For instance, running across the top of the screen which serves to group or categorize commands available to the user. Clicking on an item on the menu bar typically causes a "pull-down" menu to appear. This second or "submenu" also includes a number of items, each of which is associated with a desired action, including the display of even more menus. To select a desired action, the user usually clicks the corresponding menu item with the screen or mouse pointer. For some menu items, particularly those which may be nested in several layers deep, a keyboard equivalent or "hot key" may be available but, unfortunately, these must also be memorized by the user.

The traditional approach of implementing a user interface or graphic surface is to include a representation of programs available on the computer system, for example through icons. Within a particular program, the graphic surface is used to represent the particular routines (i.e., functionality) within that program. In Microsoft's Bob™, for instance, when the user clicks on a calendar icon, the calendar portion of the program opens or executes. Similarly, when the user clicks on a clock icon, a clock module of the program begins execution. Or if the user clicks on a checkbook icon, execution of a checking module begins. All told, the traditional approach of implementing a graphic surface is to represent objects from the programmer's point of view (i.e., program functionality) not from the user's point of view.

However, the task of creating an intuitive interface is more complicated than just including representations of user data on screen. For a static or even semi-dynamic graphic surface type programs, the designer can to a large extent plan ahead. In Broderbund's Living Books™, for instance, a portion of the graphic surface is reserved as a trigger, such as a particular corner on screen, which the user selects to go to the next classroom in the program. In another location, the designer may place a clock, which the user may (or may not) drag around. Such environments, although allowing some latitude, are essentially portraying a static or fixed world.

In an effort to address the foregoing problem, program designers have added "customization" features to programs. Consider, for instance, a customizable program such as Microsoft® Word for Windows which includes a multitude of icon and menu representations of functionality. To adapt the functionality to a particular user, Microsoft Word includes a multitude of customization options. Such an approach is not practical for beginning users, however. In particular, these users have not even mastered enough basic skills of the program to undertake the task of customization. When customizing programs, for instance, beginning users will often "lose" particular components of a program (e.g., tool bar) and then be unable to figure out how to restore those components.

What is needed is system and methods which implement a graphic surface or interface from the user's perspective. In particular, such a system should include methods for implementing a graphic surface with representations which are important to the user—representations of components of actual user data on screen.

SUMMARY OF THE INVENTION

The present invention recognizes that present-day implementations of graphical user interfaces often serve to further confuse a user of a computer system. The traditional approach to user interface design, even when a graphic user interface is employed, is to associate screen objects (e.g., icons) with particular applications or functionality. Microsoft's Bob™, for instance, comprises a bitmap graphic interface which includes objects such as a clock and a rolodex. These objects, in turn, have pointers into applications—that is, the applications which each launches, respectively. In other words, each component in the graphic essentially represents an application.

The present invention eschews the foregoing approach, as it is generally confusing to users. Providing a component in the graphic (e.g., clock) and then providing an application view (i.e., launching the respective application upon selecting the component) is an unfamiliar approach to novice users. Quite simply, that approach has nothing to do with the user's previous experience. As a result, to find one's data in a traditional interface, the user must "hunt around" for the appropriate graphic component which launches the appropriate application, before finally reaching the user's own data (which is what the user has wanted all along). Such an approach—reaching one's data of interest by launching various applications (which are generally unfamiliar)—is contrary to the approach adopted by the present invention.

The present invention approaches interface design as follow. The interface is divided into two basic regions. A first region comprises and outer frame which is employed for representing applications of the system in a traditional, iconized form. The outer frame, therefore, allows those users already familiar with a traditional approach (i.e., more experienced users) to continue using the traditional approach, should they desire. Here, the user can cycle through various programs or modules within the Information Management System, as desired.

In addition to this, however, the present invention also provides a second region which comprises a core representation of the user's own data. As previously illustrated, in a preferred environment, the second is preferably a centralized region comprising a world or "landscape" which represents the user's own data. Although the interface of the present invention includes as one approach the iconized application approach, the landscape approach is the preferred method for operating a computer system, as it highlights what the user is trying to look at (i.e., his or her own data). This provides users, particularly novice users, with a shortcut to the information which they really wish access to.

The landscape shows a representation of the most important data to the particular user who is currently operating the system. The landscape, therefore, is not necessarily the same from one system to another. Instead, the landscape adjusts its representation to match the needs of the user. For instance, one user might have important data about two cars. A second user, on the other hand, might have important data about a house. In this simple example, the landscape for the first user would include representations for the two cars. To gain access to that information, the first user need only select one of the cars from the landscape (e.g., by clicking on it). The landscape for the second user, on the other hand, would comprise a house. Here, the second user would gain instant access to important information about the house by simply selecting it.

At the same time, neither user is distracted by representations of data or functionality which is not important to the user. The landscape for the first user, in this simple example, would not include a representation of a house, as that user has no house information. Similarly, the landscape for the second user would not represent any cars, as that user has no automobiles to track. All told, what is "important" to a user (and what is represented in the landscape) depends on how the user has actually used the system. In a traditional system, creating the interface (i.e., displaying the icons) is a straightforward matter. Generally, each application icon will have a fixed size, and each icon will generally have a clear-cut correlation to a particular application. Creating the landscape interface in the present invention, is not such a simple task, as there is no pre-set size or fixed correlation.

To actually render the landscape with representations of the data most important to the user, the system of the present invention, at runtime, actually examines the underlying data which has been stored by the user using the Databank storage mechanism 130, which is described in particular detail in applicants' co-pending, commonly-owned application Ser. No. 08/451,734. (Although the Databank storage mechanism is the preferred storage mechanism, conventional storage methodology may also be employed.) In a traditional system, therefore, the user interface is fairly static: changes are generally only made via user customization, which in itself is a confusing process. In the system of the present invention, in contrast, the interface is dynamic: at runtime the system represents in the interface the data which is most important to the user. In other words, the present invention dynamically alters the user interface at runtime to include representations of information which is important to the user.

The approach adopted by the present invention is to present an interface comprising a background bitmap and further comprises diverse objects which are "plugged into" the background. Each object which is plugged in is typically a completely separate object which represents particular user data which is of interest to the currently logged-on user. Additionally, the system permits multiple background bitmaps or landscapes so that the user may select a preferred representation. For example, the user can select an urban setting, a country setting, a cartoon setting, or the like. The system, in turn, automatically adapts the objects placed on the landscape for the particular background setting which the user has chosen. Additionally, the user can select completely different landscape environments. For example, the user might select a business landscape for representing his or her data. In response, the system (based on the user's actual data) regenerates the appropriate objects which are plugged into the landscape for representing the user's own data.

The present invention includes a method for displaying a user interface or shell for controlling an application program(s). The method includes displaying a background image representing an environment of interest to the user (e.g., image of the user's "world"). On this background, one or more object images (e.g., automobile, house, family members, and the like) are displayed for providing access to user data for a particular one of the objects. The user selects one of the object images (e.g., with a mouse device). The system responds by displaying a list of user data pertaining to selected object (e.g., insurance, loan, and maintenance records pertaining to the automobile). From this list, the user can select a data item of interest which pertains to the particular object (e.g., automobile insurance policy data item). Finally, the method, in response to user input, can then launch execution of a particular portion of the application program for manipulating and representing the selected data item (e.g., a dialog or editor for modifying information about the insurance policy).

DETAILED DESCRIPTION OF A PREFERRED EMBODIMENT

The following description will focus on the presently preferred embodiment of the present invention, which is operative in an end-user application running under the Microsoft® Windows environment. The present invention, however, is not limited to any particular one application or any particular environment. Instead, those skilled in the art will find that the system and methods of the present invention may be advantageously applied to a variety of system and application software, including database management systems, wordprocessors, spreadsheets, and the like. Moreover, the present invention may be embodied on a variety of different platforms, including Macintosh, UNIX, NextStep, and the like. Therefore, the description of the exemplary embodiments which follows is for purposes of illustration and not limitation.

System Hardware

Figure 1A:
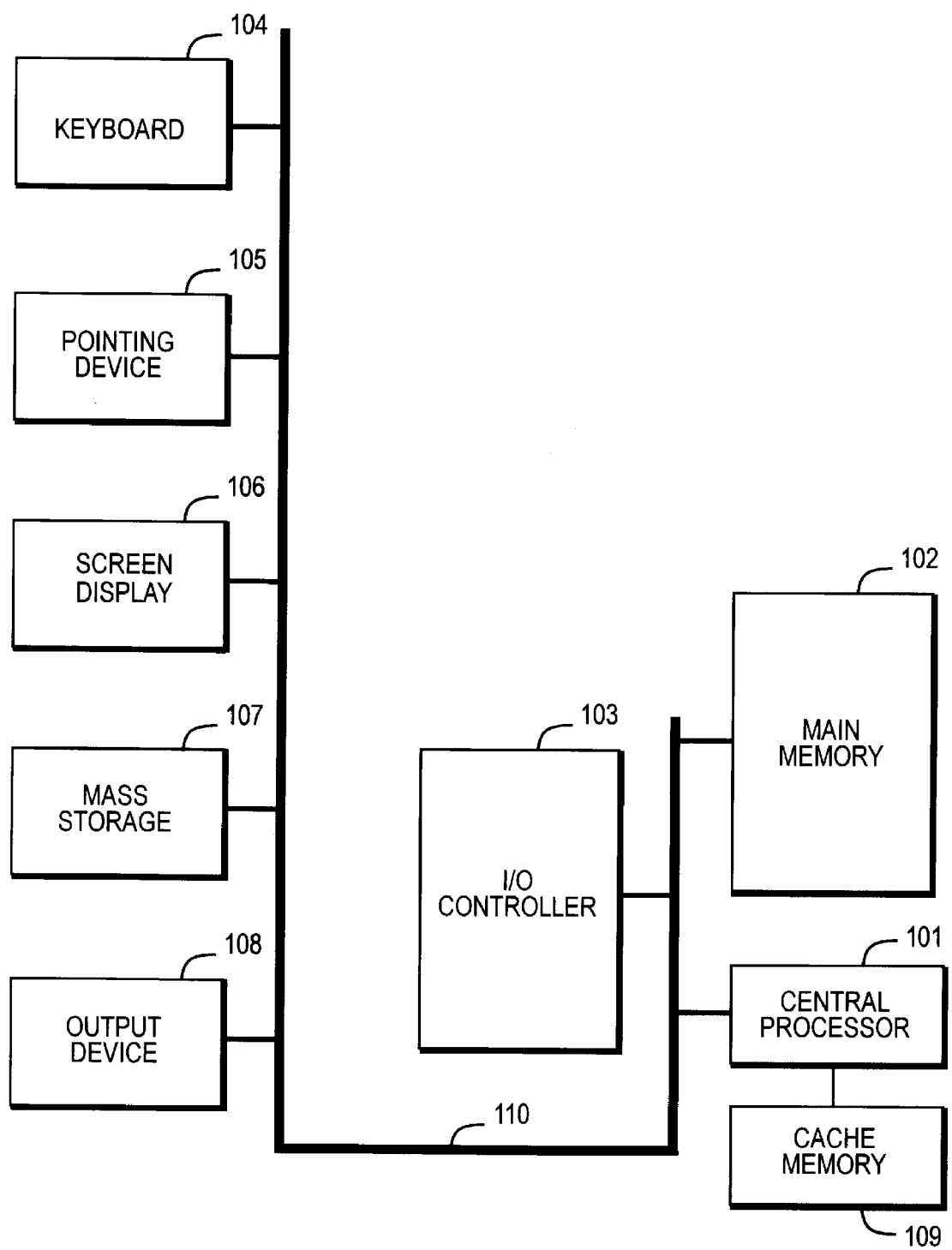
FIG. 1A is a block diagram of a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a display device 106, and a mass storage 107 (e.g., hard or fixed disk, optical disk, magneto-optical disk, or flash memory). Processor 101 includes or is coupled to a cache memory 109 for storing frequently accessed information; memory 109 may be an on-chip cache or external cache (as shown). Additional input/output devices, such as a printing device 108, may be included in the system 100 as desired. As shown, the various components of the system 100 communicate through a system bus 110 or similar architecture. In a preferred embodiment, the system 100 includes an IBM PC-compatible personal computer, available from a variety of vendors (including IBM of Armonk, N.Y.).

System Software

A. Overview

Figure 1B:
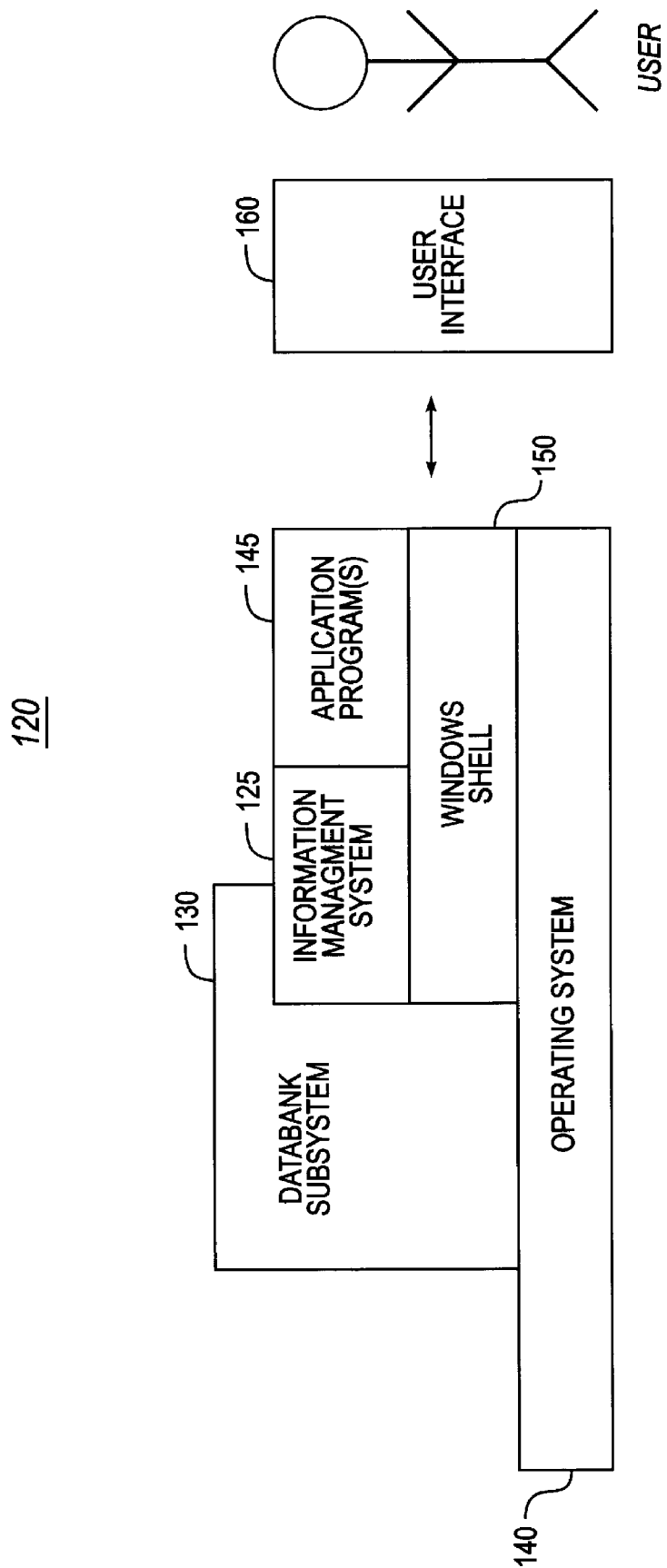
FIG. 1B is a block diagram of a software system of the present invention for controlling the operation of the system of FIG. 1A.

Illustrated in FIG. 1B, a computer software system 120 is provided for directing the operation of the computer system 100. Software system 120, which is stored in system memory 102 and on disk memory 107, includes a kernel or operating system (OS) 140 and a windows shell 150. One or more application programs, such as client application software or "programs" 145 may be "loaded" (i.e., transferred from storage 107 into memory 102) for execution by the system 100. One application software comprises an Information Management System 125 of the present invention employing a Databank storage subsystem 130, which stores non-uniform data in a Databank table. As described in Applicants' co-pending, commonly-owned application Ser. No. 08/451,734, the Databank storage subsystem 130 provides an improved storage mechanism for the system of the present invention.

System 120 includes a user interface (UI) 160, preferably a Graphical User Interface (GUI), for receiving user commands and data. These inputs, in turn, may be acted upon by the system 100 in accordance with instructions from operating module 140, windows 150, and/or client application module(s) 145. The UI 160 also serves to display the results of operation from the OS 140, windows 150, and application(s) 145, whereupon the user may supply additional inputs or terminate the session. In a preferred embodiment, OS 140 is MS-DOS and windows 145 is Microsoft® Windows; both are available from Microsoft Corporation of Redmond, Wash. Although shown conceptually as a separate module, the UI is typically provided by interaction of the application modules with the windows shell, both operating under OS 140. More particularly, the UI which is provided by the Information Management System 125 comprises a user data-based interface of the present invention, which will now be described in further detail.

Landscape: User-centric interface

A. Overview

The task of representing a program's interface has remained a problem for software designers. Although a program may be represented to the user in terms of its functionality (i.e., routines), the ability of novice users to access and manipulate their own data is largely lost, as one must instead expend effort learning yet another program's interface—often an arbitrary model of what a programmer or designer thought the user might want.

The present invention provides a system with methods for portraying representations of whole ranges of data which the user might encounter and the functionalities which underlie that data. The user finds himself or herself in a representation of his or her own world, of the user's own data, which he or she is familiar with, instead of an abstraction which has little relevance to what the user is actually doing. Instead of forcing the user to adopt an abstraction based on a program's functionality (which typically users will only utilize ten to twenty percent), the present invention provides a graphic surface which only shows items which the user has shown an interest. In other words, the graphic surface includes objects whose functionality is 100% utilized by the user. Thus, the graphic surface is modeled more after the user (i.e., the user's actual data) and, therefore, modeled far less on what a programmer or designer thought the user might want.

The present invention, therefore, provides a world or "landscape" which includes representations of objects important to the user. Objects which are important to the user include, for example, the user's house, the user's car, the user's pet, and the like. With this approach, the user can build a world and select into that world objects which the user finds to be of interest.

B. Landscape

Figure 2:
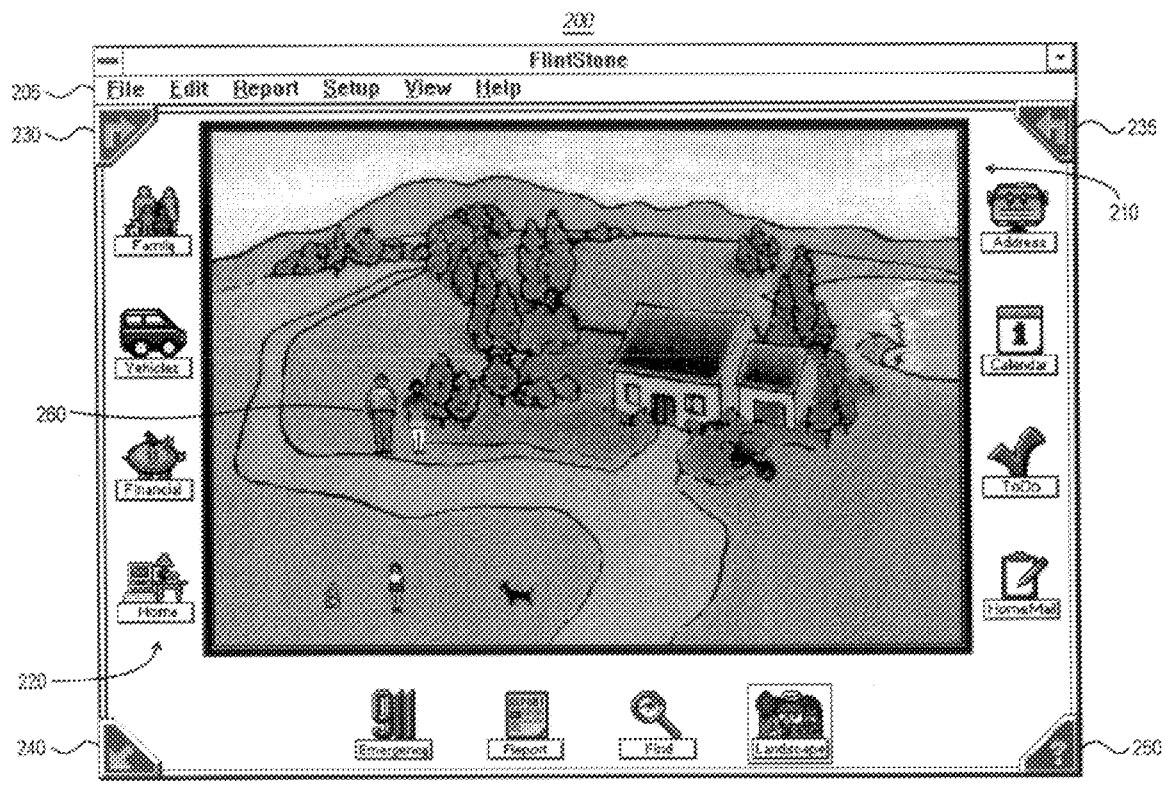
FIG. 2 illustrates a preferred interface of the system of the present invention, which includes a "landscape" representation of objects important to the user.

FIG. 2 illustrates a preferred interface 200 of the system of the present invention. As shown, the interface includes a graphic surface or "landscape" 210. The landscape 210 comprises a bit map background and one or more persons and associated items which may be placed in the landscape. At the outset, the system generates a default set of objects based on parameters initially provided to the system by the user, typically provided through an interview. An exemplary interview might include questions asking whether the user is married, what is the name of the user's spouse, how many children does the user have and what are their names, how many cars does the user have, and the like. In this manner, the system gleans core information about the user's family and then chooses an optimal representation for that family on screen.

For an embodiment adapted for the abovementioned family use, the landscape would include representations geared toward representing that family. It would include, for example, representations of adults, children, cars, motorcycles, houses, pets, and the like. In an embodiment adapted for business use, on the other hand, the landscape would include objects geared for representing the user's own data in his or her business world. In such an embodiment, the landscape would include, for example, representations of price items, inventory, collections, and the like. Regardless of the adaptation of the present invention (i.e., whether for home or for business), the graphic surface contains only items which pertain directly to the user; it does not contain items which pertain to different parts (i.e., functionality) of the underlying program per se.

In addition to the graphic surface or landscape 210, the interface 200 also includes icon representations of task 220. Thus the interface 200 also allows the user to access particular functionality of the program in a traditional manner, if desired. As also shown, the interface 200 also includes a next button 230, a previous button 235, a log on/log off button 240, and a help button 250. The next button 230 navigates from icon to icon, according to a defined order.

The system is designed for operation by multiple users, but on a single PC (e.g., family members using a single family PC). To guide each session, therefore, the user selects the log on/log off button 240 to sign in. Once a particular user signs on, the system allows the user to only access his or her data, or data which another user has decided to share.

C. Invoking a user's own data

The user gains access to his or her data by selecting (e.g., clicking on with a screen cursor/mouse device) the element on the landscape associated with the desired data. To access the user's own personal data, for instance, the user would select or click the adult FIG. 260. The result of this action is shown in FIG. 3.

Figure 3:
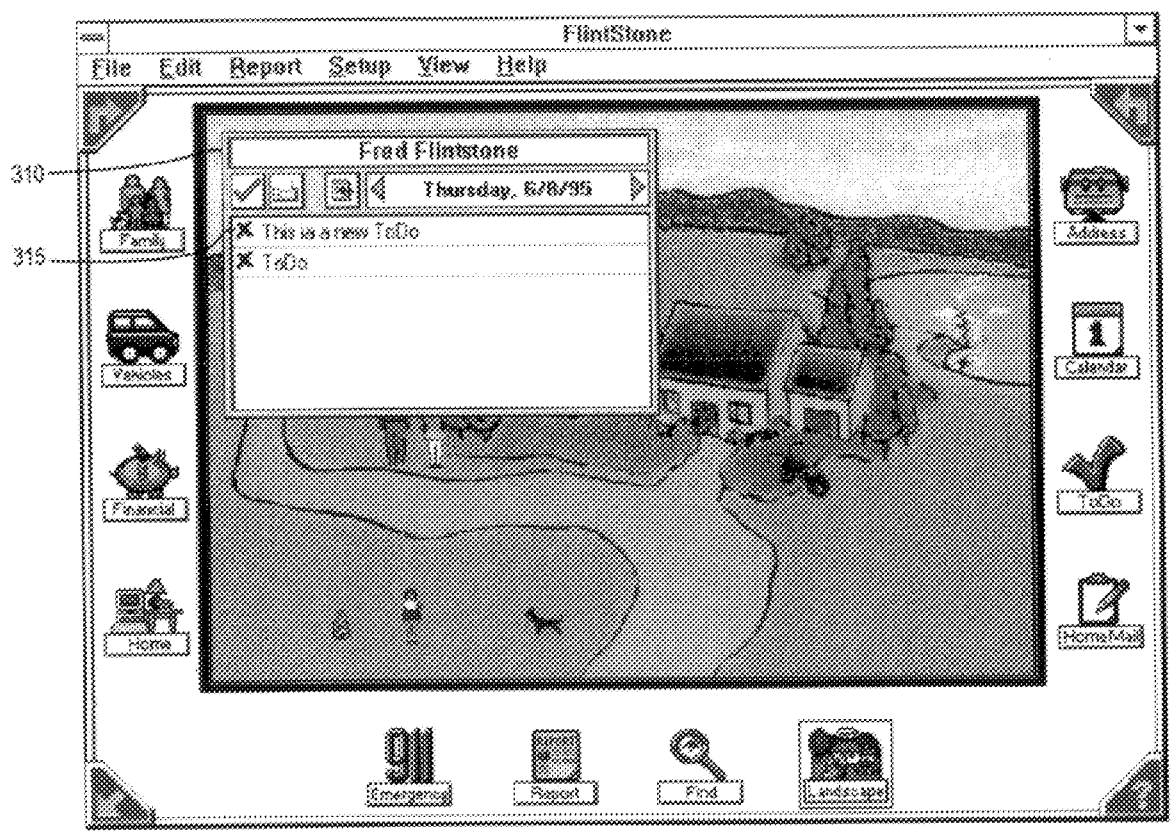
FIG. 3 illustrates how a user gains access to his or her data by selecting an element on the landscape associated with the desired data.

In response to the above user input, the system displays the dialog 310, as shown in FIG. 3. Here, clicking on the figure brings up a list of data items relevant to this object— the user himself. The current data items, for the user of this example, include To Do items. From this list, the user can "drill down" to particular data items, by selecting (e.g., double clicking) on the desired item. Double clicking on the To Do item 315, for instance, brings up a To Do editor loaded with the particular To Do data item for this user. Thus selecting a particular object in the graphic surface brings up a list of items which are specific to that particular object.

Figure 4:
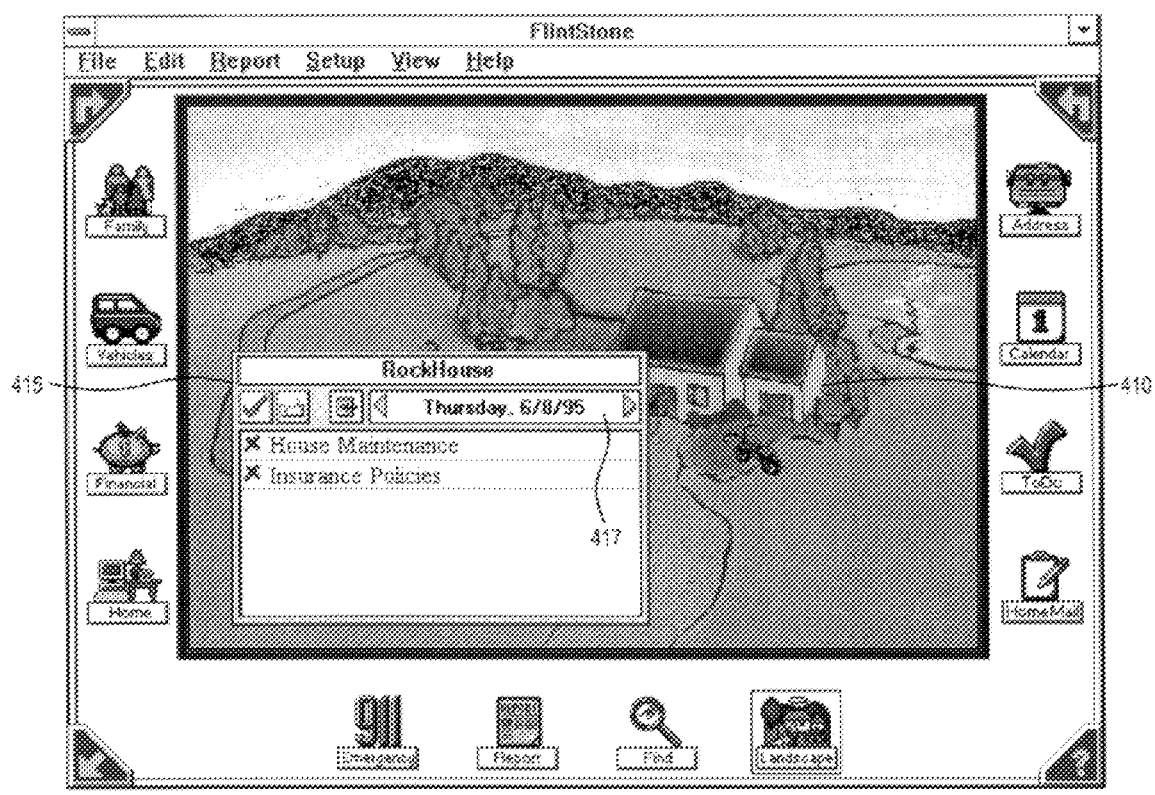
FIG. 4 illustrates the action of clicking on a "landscape" object to bring up a list of data items relevant to that object

FIG. 4 illustrates the operation for the user's house. In response to the user selecting (e.g., clicking) house 410, the system displays house dialog 415. In a manner similar to that described above for the user dialog 310, the house dialog 415 includes data items specific for the house. Relevant data items for the house include, for instance, upcoming maintenance items, insurance policies, and other data items or documents relevant to that particular object. In this manner, the dialog 415 serves as a navigator for navigating particular data items which are relevant to a selected object.

D. Navigator

The dialog 415 (as well as the dialog 310 in FIG. 3) becomes a navigator for the selected object. Specifically, the user can navigate or browse a particular item displayed in the navigator list by simply selecting (e.g., clicking) on the desired item. The navigator 415 includes a user-settable filter 417, for allowing the user to filter items which are displayed on the list. The navigator itself serves as a connection between objects on the graphic surface and underlying components or modules of the system which are relevant for a selected object.

Figure 5A:
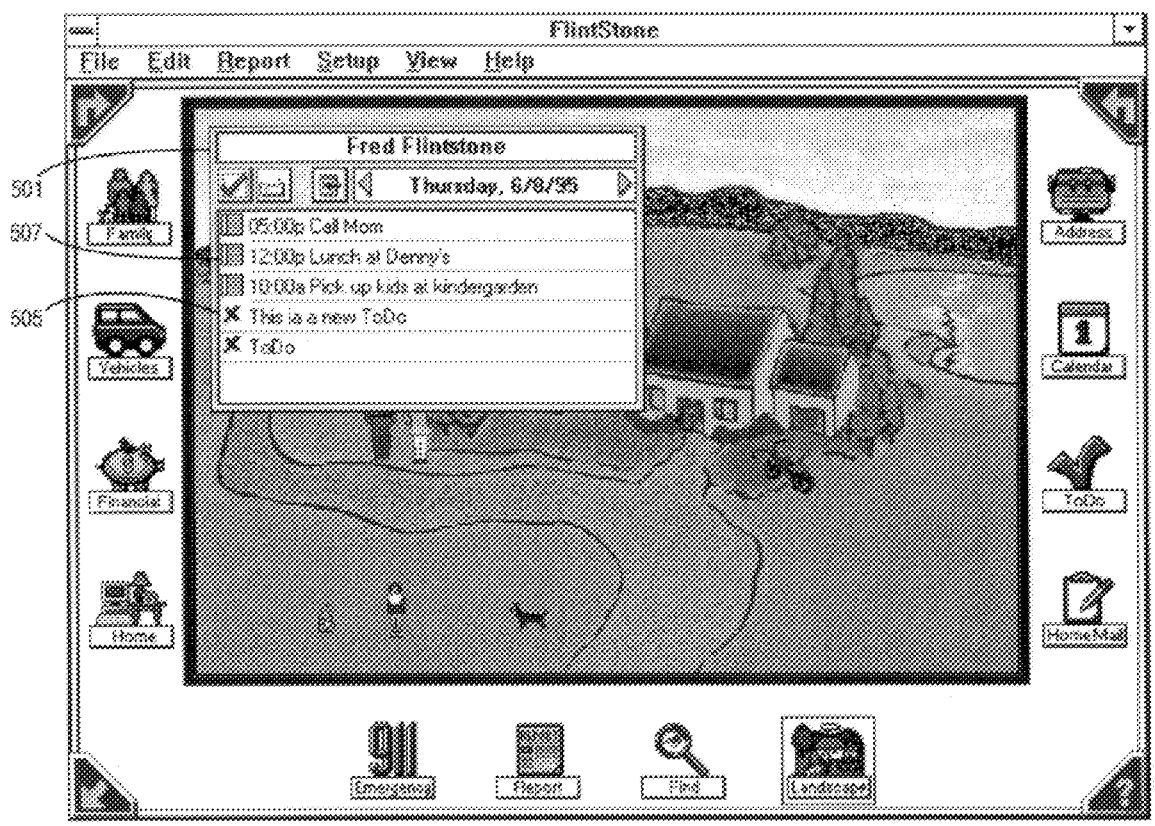
FIGS. 5A–C illustrate use of a navigator of the present invention, which serves as a connection between objects on the graphic surface and underlying components or modules of the system which are relevant for a selected object.
Figure 5B:
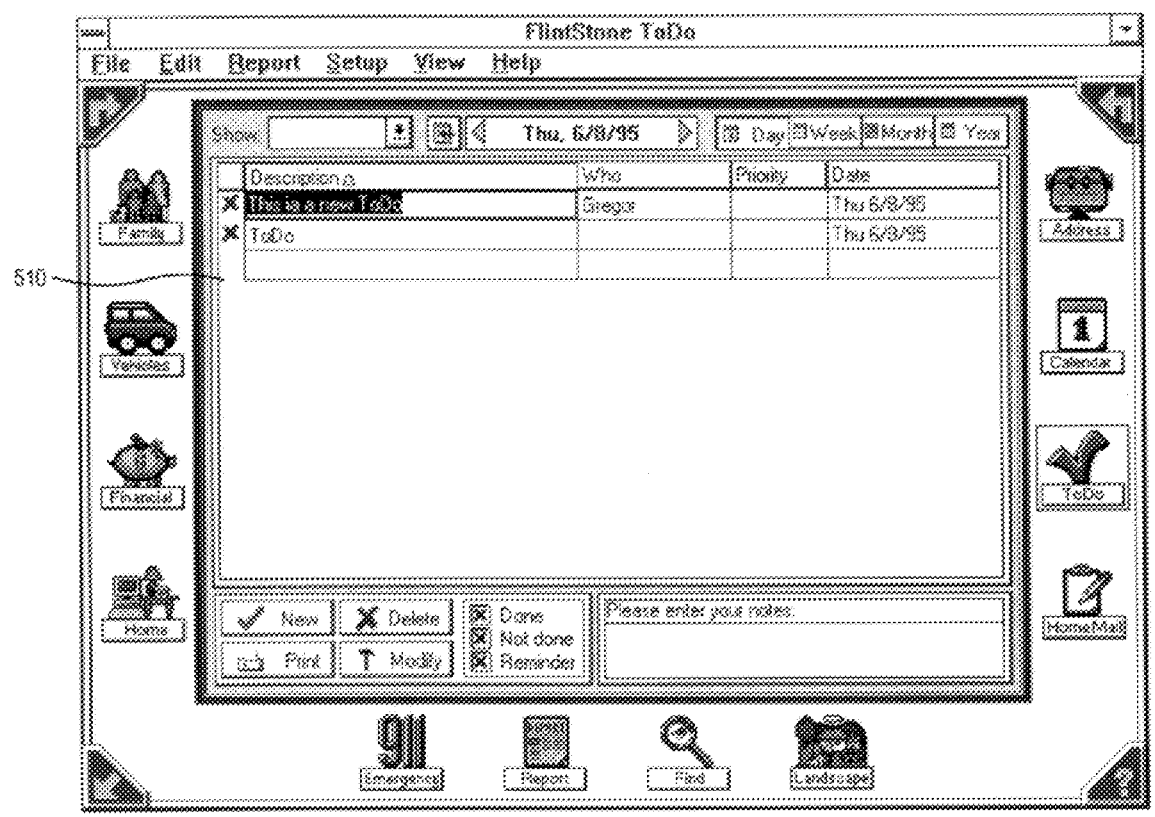
Figure 5C:
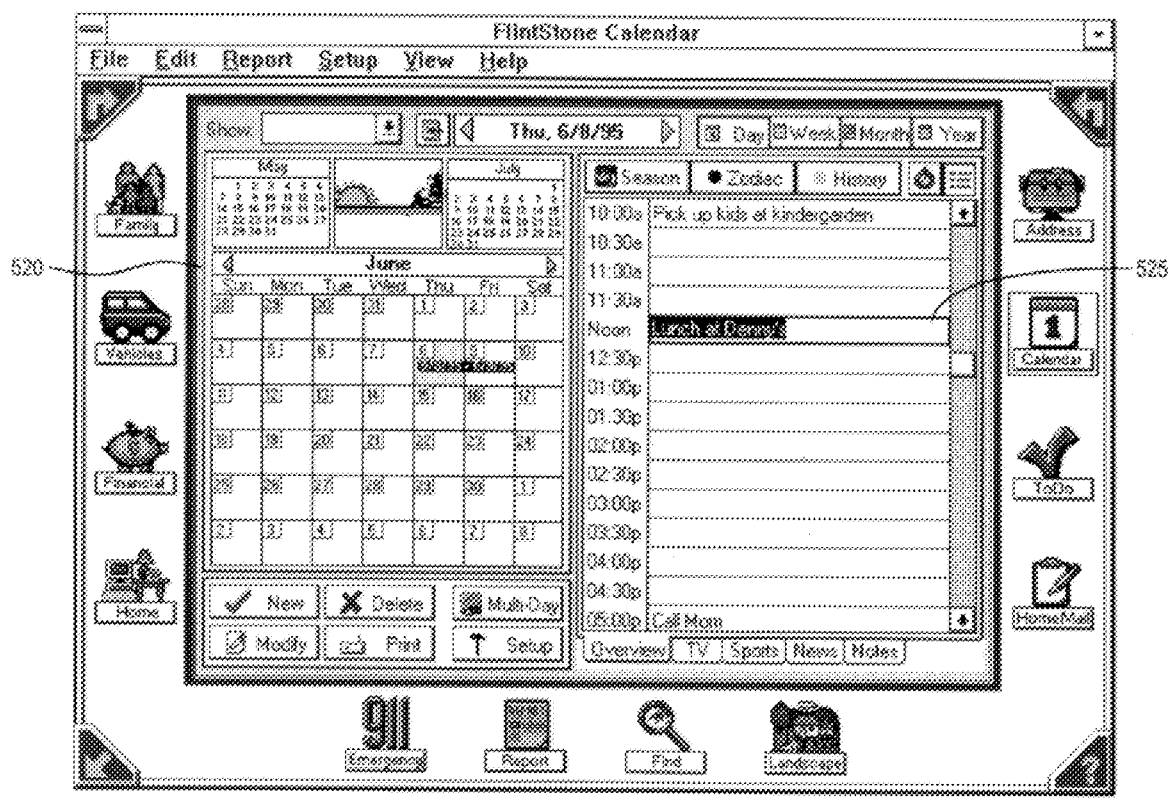

This operation is illustrated in FIGS. 5A–C. In FIG. 5A, the user has requested navigation to a "To Do" item (e.g., the "To Do" item 315 from the navigator dialog 310 shown in FIG. 3). In response, the system displays To Do dialog 510, shown in FIG. 5B. Moreover, the To Do dialog includes the user's own data—that is, the specific data items stored in the system for the object which the user selected on the graphic surface. Similarly, if the user selects the calendar item 507 from the dialog 501 (e.g., by clicking or double clicking on the item), the system launches the calendar module as shown in FIG. 5C. Specifically, calendar interface 520 is displayed. Moreover, the selected item (i.e., item 507) is currently highlighted, as shown at 525. In this manner, therefore, the navigator includes a list of specific data items for an object. Selecting one of those data objects launches an appropriate module (e.g., editor) for interacting with (e.g., editing) that data item. Data items for other objects, however, are not surfaced to the user at this point.

Figure 6A:
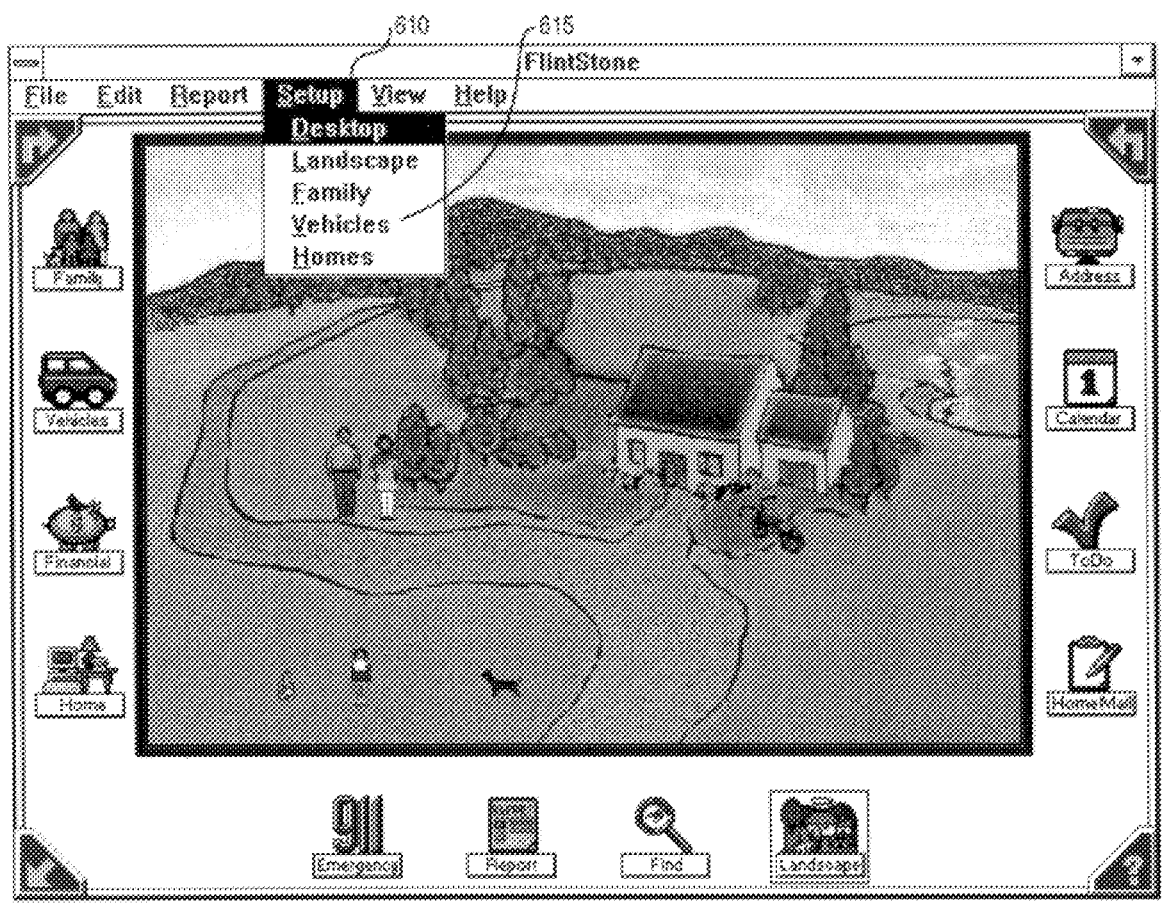
FIGS. 6A–E illustrate the operation of adding a new object to the landscape.
Figure 6B:
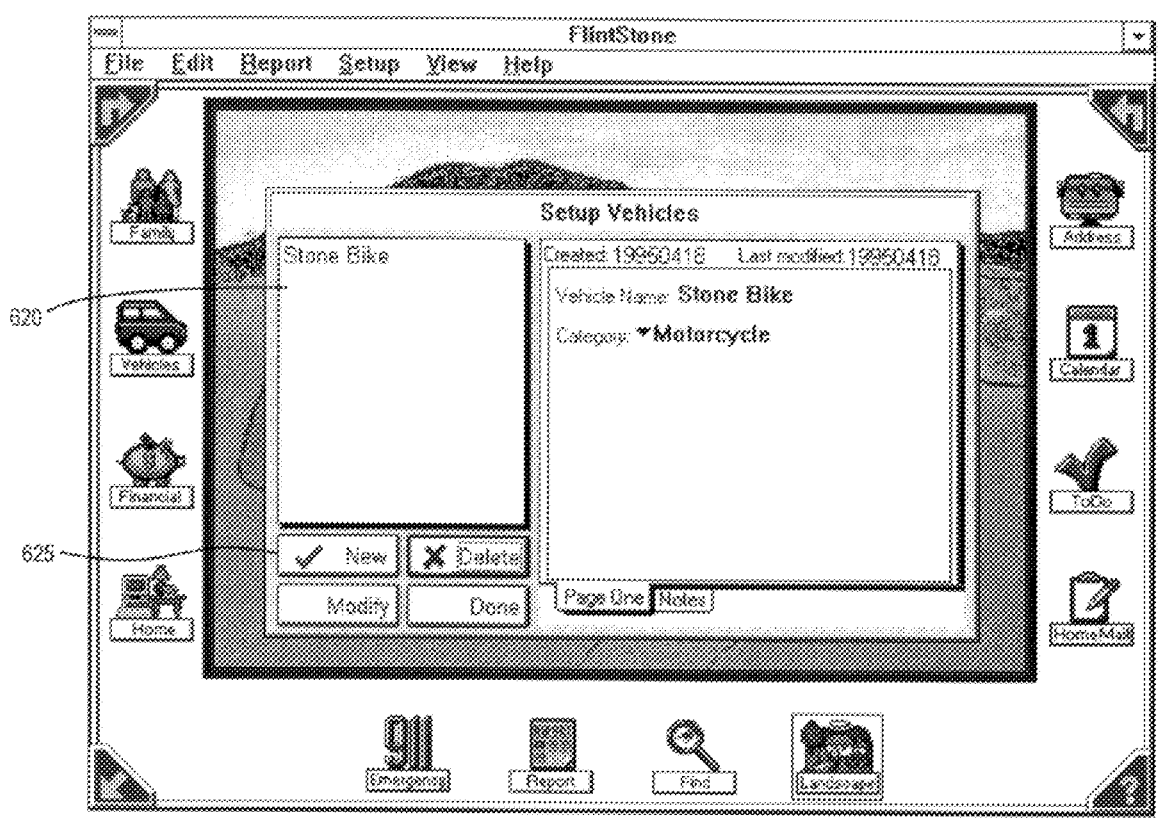
Figure 6C:
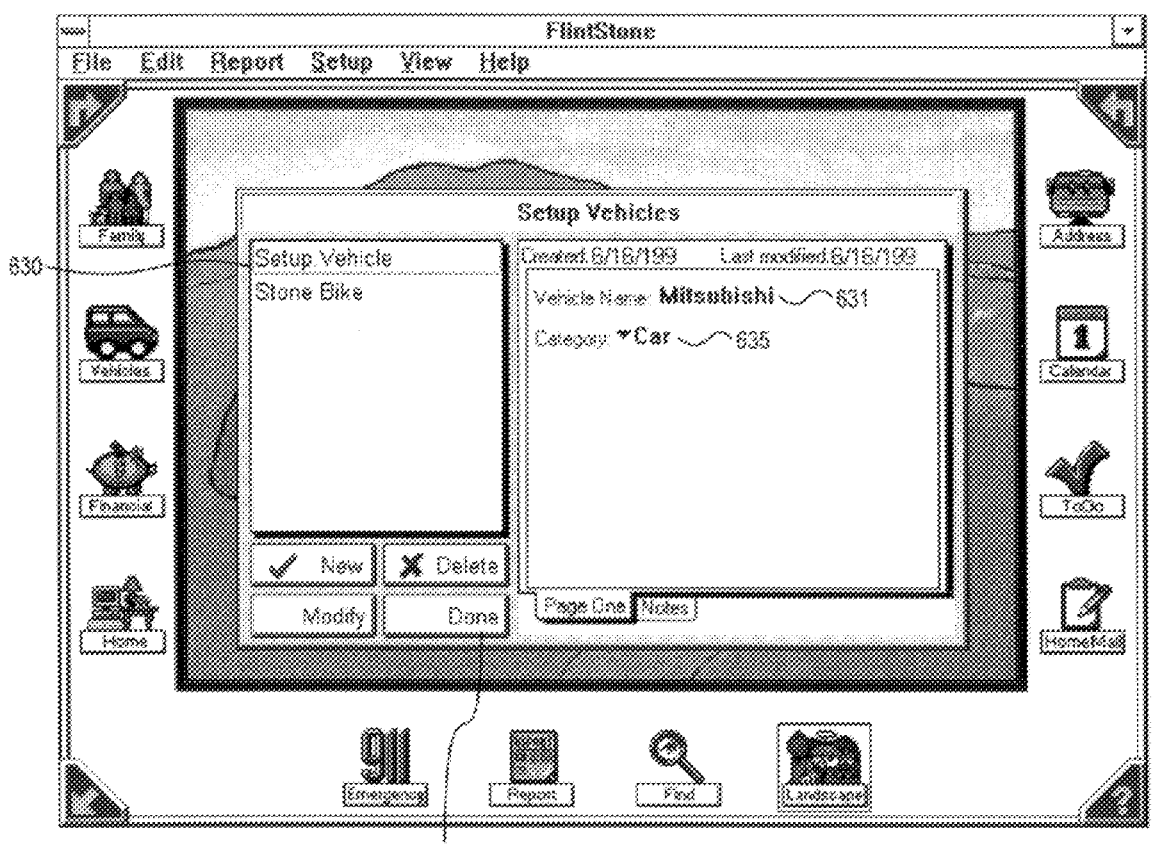
Figure 6D:
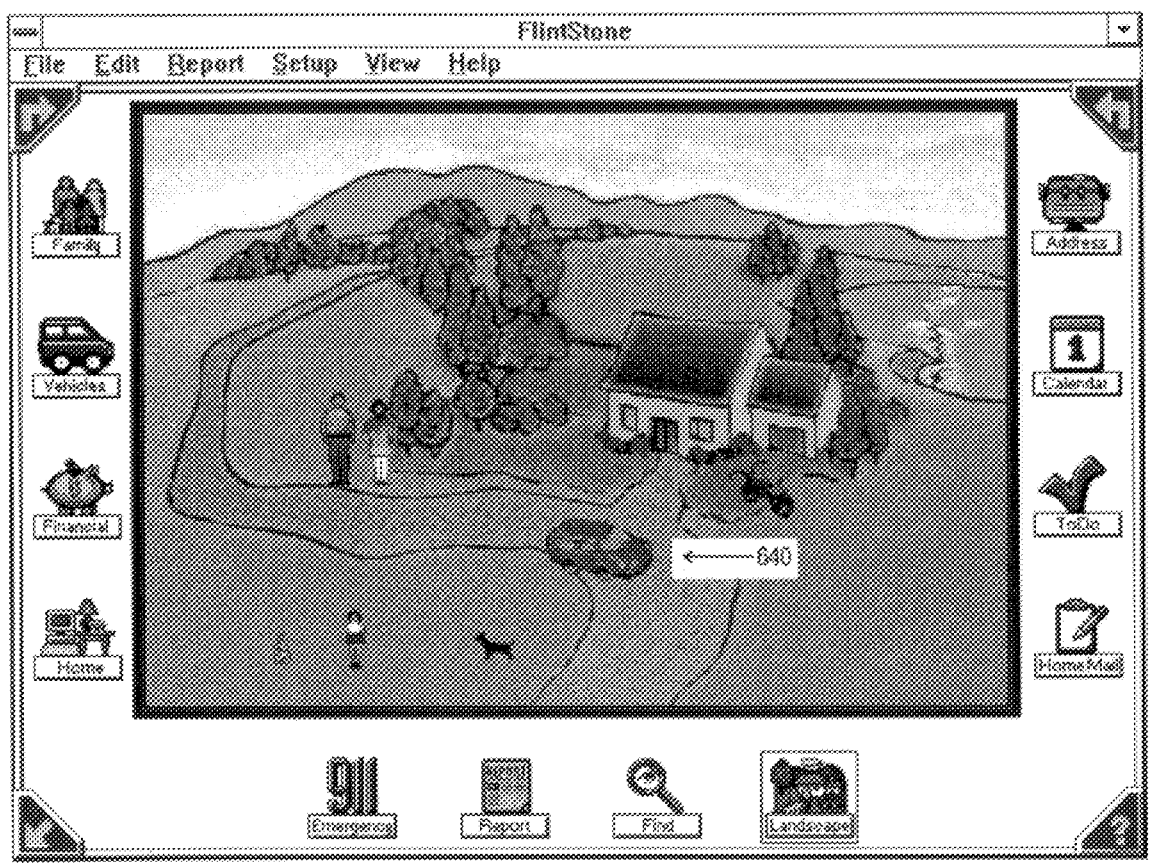
Figure 6E:
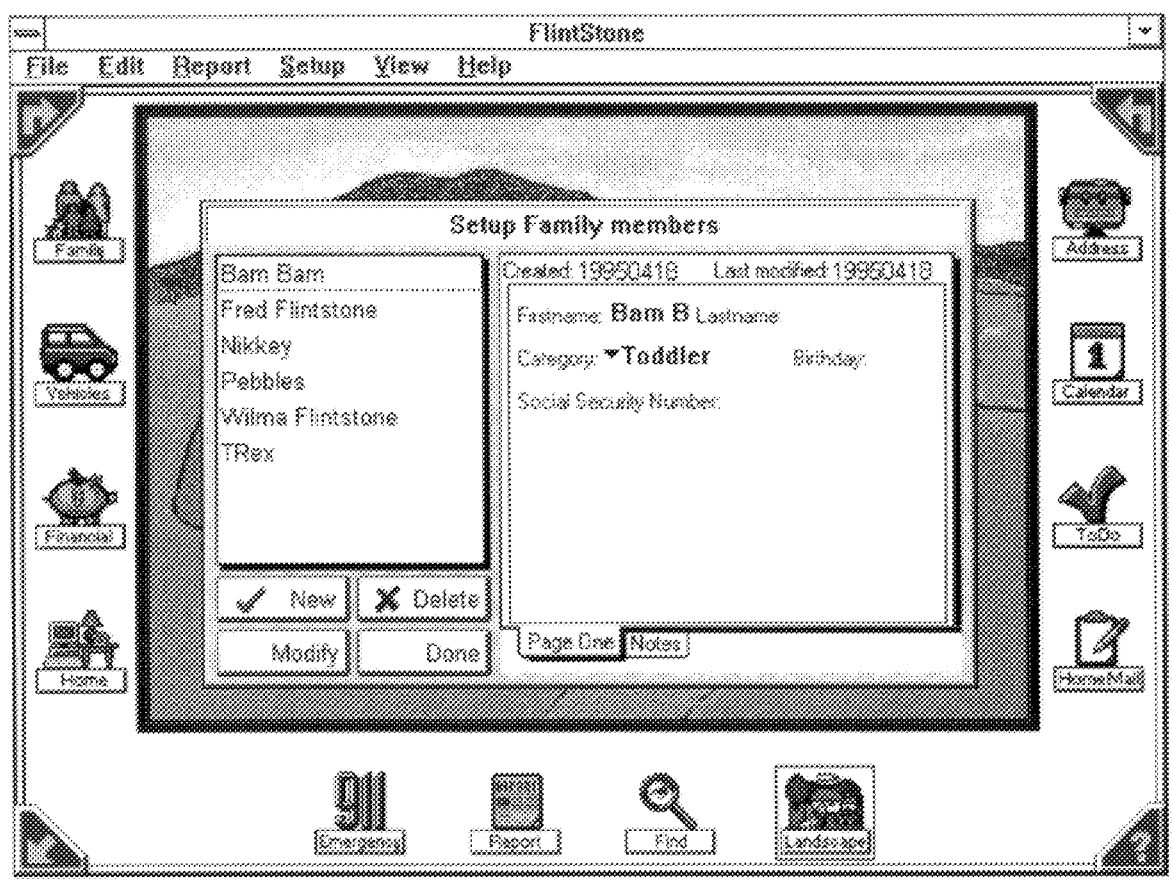

FIGS. 6A–E illustrate the operation of adding a new object to the landscape. As shown, the user selects Setup option 610 from the menu bar (i.e., menu bar 205 from FIG. 2) and then selects Vehicles choice 615. In response to this user input, the system displays a Setup Vehicles dialog 620, as shown in FIG. 6B. At this point, the dialog already shows the existing vehicle (i.e., motorcycle). To add a new vehicle, the user selects new button 625. In response to this user input, the dialog 620 is updated to include a new data item ("setup vehicle") 630, as shown in FIG. 6C. The user can now complete entry of the new object by providing relevant information (e.g., vehicle name 631 and category 635 for a vehicle). Upon selecting done button 635, the system closes the setup dialog. Additionally, the system adds the new object (here, a car) to the landscape, as shown by automobile 640 in FIG. 6D. From this point on, the user can add, modify and delete specific data items for this object by simply selecting (e.g., clicking) on the automobile 640 in the landscape, followed by selecting (e.g., clicking) the particular data item desired (e.g., insurance policy) desired. In this fashion, the user can quickly navigate to a desired data item (e.g., insurance policy for the Mitsubishi automobile), yet not be concerned about (or even aware of) data items which are not relevant to this object (e.g., insurance policy for this house). In a similar fashion, a person can be added to the landscape, such as the toddler added in FIG. 6E.

Figure 7A:
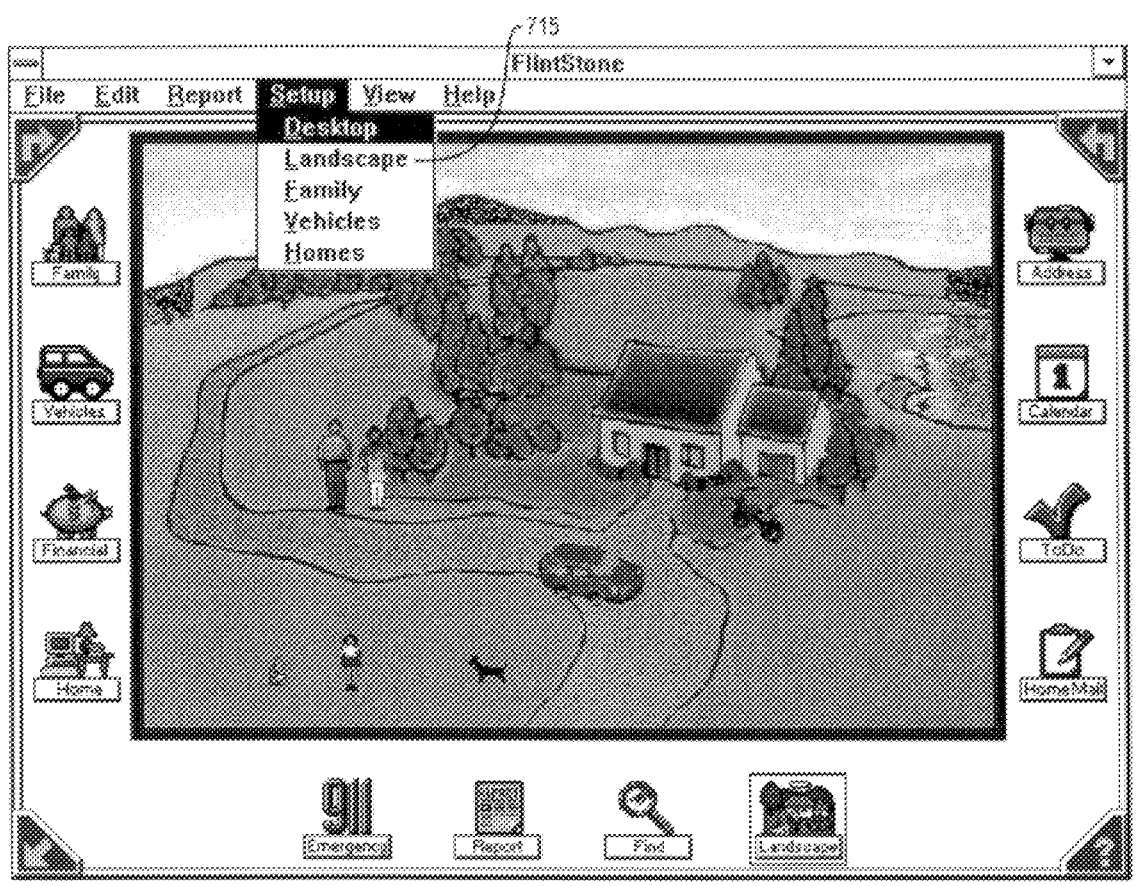
FIGS. 7A–D illustrate the operation of changing the landscape itself.
Figure 7B:
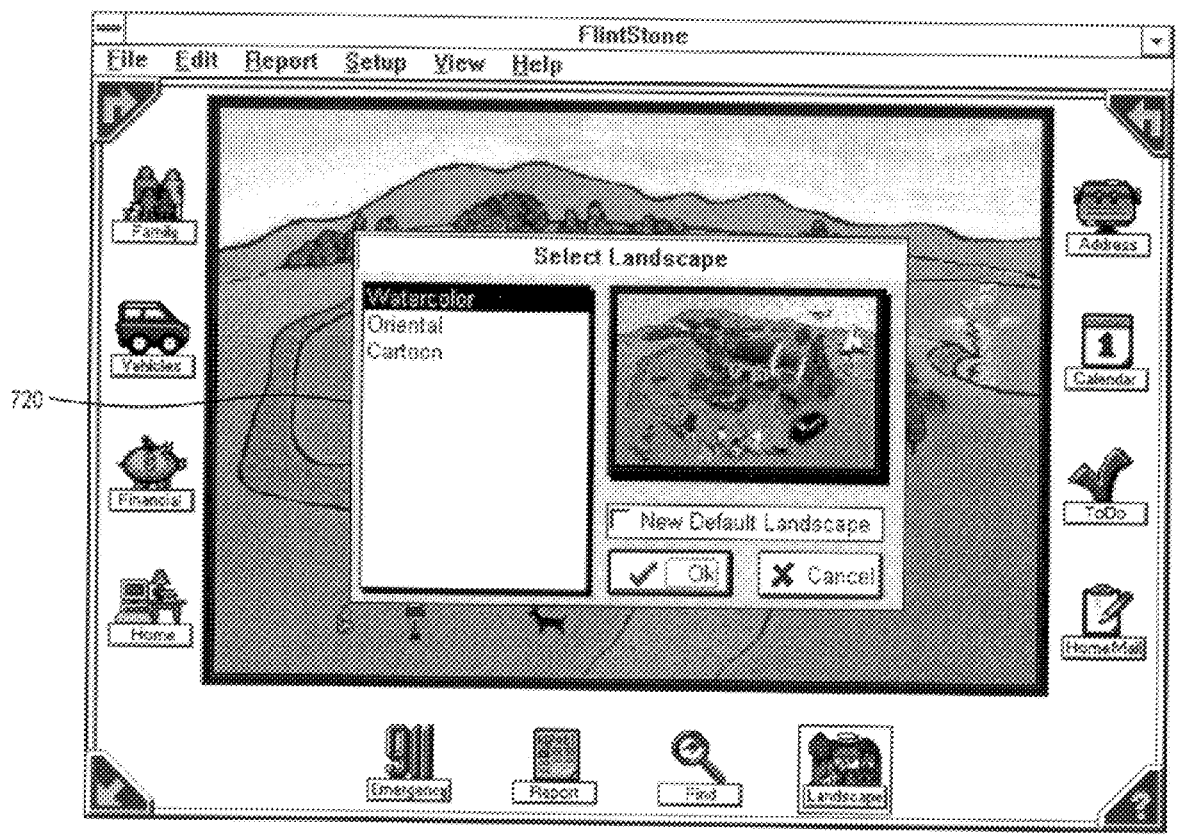
Figure 7C:
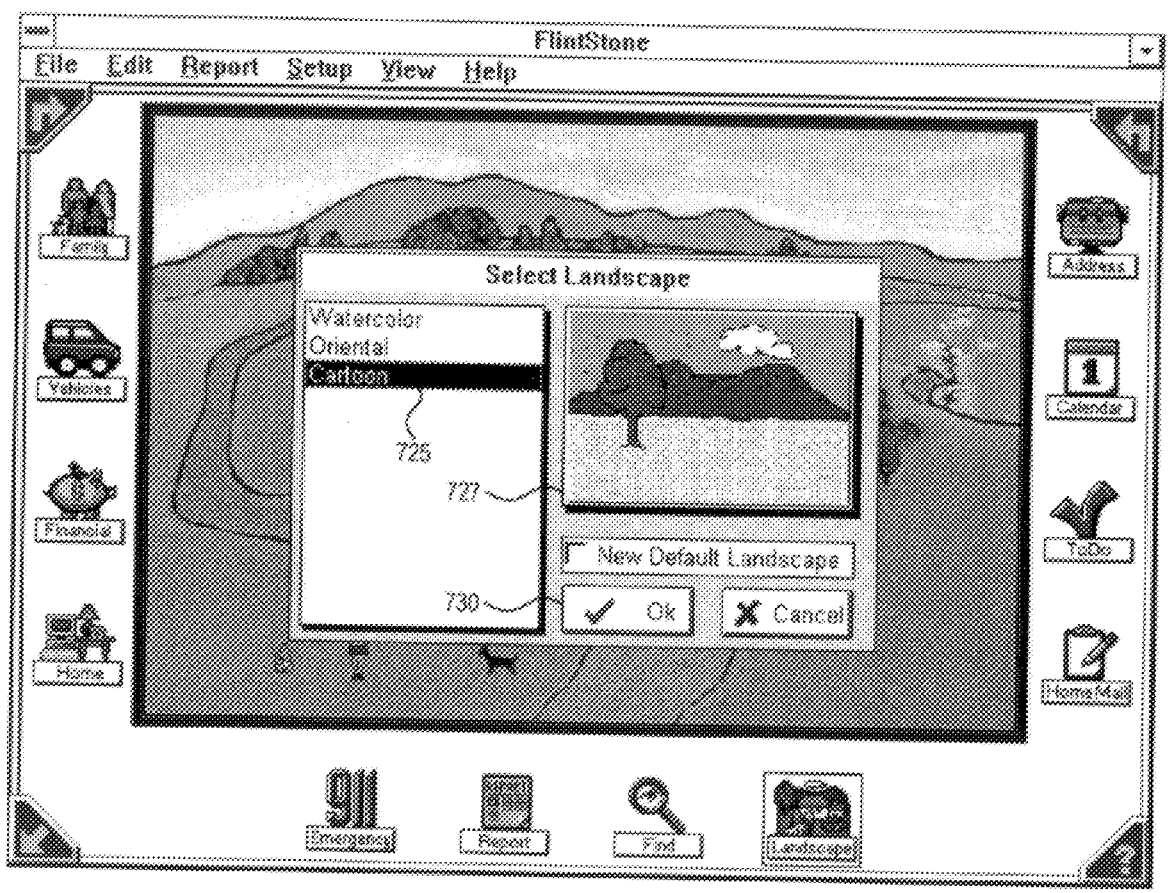
Figure 7D:
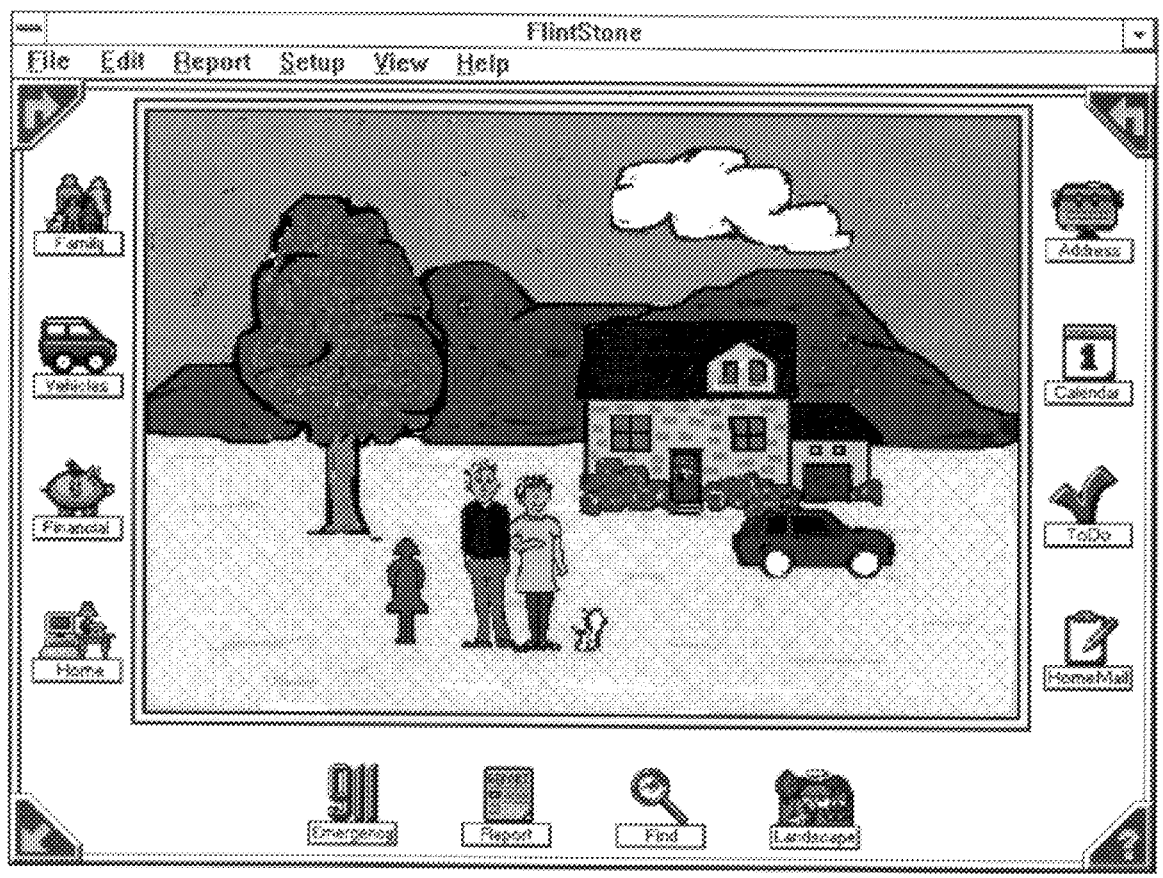

FIGS. 7A–D illustrate the operation of changing the landscape itself. As shown in FIG. 7A, the user selects landscape choice 715 from the setup menu (i.e., from the menu bar 205). In response, the system displays a select landscape dialog 720, as shown in FIG. 7B. Initially, the Watercolor landscape is selected as it is the default landscape for the system. As shown in FIG. 7C, the user can proceed to select another landscape, such as Cartoon landscape 725. A preview of the landscape is shown to the user, as indicated at 727. Once satisfied with the new landscape, the user can select (e.g., click) OK button 730. In response to this input, the system closes the select landscape dialog and updates the landscape with a new background bitmap and object bitmaps, as shown at 740 in FIG. 7D.

Internal Operation

A. Design Considerations

The traditional approach to user interface design, even when a graphic user interface is employed, is to associate screen objects (e.g., icons) with applications. Microsoft's Bob™, for instance, comprises a bitmap graphic interface which includes objects such as a clock and a rolodex. These objects, in turn, have pointers into applications—that is, the applications which each launches, respectively. In other words, each component in the graphic essentially represents an application.

The present invention eschews the foregoing approach, as it is generally confusing to users. Providing a component in the graphic (e.g., clock) and then providing an application view (i.e., launching the respective application upon selecting the component) is an unfamiliar approach to novice users. Quite simply, that approach has nothing to do with the user's previous experience. As a result, to find one's data in a traditional interface, the user must "hunt around" for the appropriate graphic component which launches the appropriate application, before finally reaching the user's own data (which is what the user has wanted all along). Such an approach—reaching one's data of interest by launching various applications (which are generally unfamiliar)—is contrary to the approach adopted by the present invention.

The present invention approaches interface design as follow. The interface is divided into two basic regions. A first region comprises and outer frame which is employed for representing applications of the system in a traditional, iconized form. The outer frame, therefore, allows those users already familiar with a traditional approach (i.e., more experienced users) to continue using the traditional approach, should they desire. The user can cycle through various programs or modules within the Information Management System using the previously-described next button (230) and previous button (235). For each module which the user selects, the landscape is replaced with the interface for that module (e.g., such as shown previously for the calendar module in FIG. SC).

In addition to this, however, the present invention also provides a second region which comprises a core representation of the user's own data. As previously illustrated, in a preferred environment, the second is preferably a centralized region comprising a landscape which represents the user's own data. Although the interface of the present invention embodies the iconized application approach, the landscape approach is the preferred method for operating a computer system, as it highlights what the user is trying to look at (i.e., his or her own data). This provides users, particularly novice users, with a shortcut to the information which they really wish access to.

The landscape shows a representation of the most important data to the particular user who is currently operating the system. The landscape, therefore, is not necessarily the same from one system to another. Instead, the landscape adjusts its representation to match the needs of the user. For instance, one user might have important data about two cars. A second user, on the other hand, might have important data about a house. In this simple example, the landscape for the first user would include representations for the two cars. To gain access to that information, the first user need only select one of the cars from the landscape (e.g., by clicking on it). The landscape for the second user, on the other hand, would comprise a house. Here, the second user would gain instant access to important information about the house by simply selecting it.

At the same time, neither user is distracted by representations of data or functionality which is not important to the user. The landscape for the first user, in this simple example, would not include a representation of a house, as that user has no house information. Similarly, the landscape for the second user would not represent any cars, as that user has no automobiles to track. All told, what is "important" to a user (and what is represented in the landscape) depends on how the user has actually used the system. In a traditional system, creating the interface (i.e., displaying the icons) is a straightforward matter. Generally, each application icon will have a fixed size, and each icon will generally have a clear-cut correlation to a particular application. Creating the landscape interface in the present invention, is not such a simple task, as there is no pre-set size or fixed correlation.

To actually render the landscape with representations of the data most important to the user, the system of the present invention, at runtime, actually examines the underlying data which has been stored by the user using the Databank storage mechanism 130 (which is described in particular detail in applicants' co-pending application Ser. No. 08/451, 734). In a traditional system, therefore, the user interface is fairly static: changes are generally only made via user customization (which in itself is a confusing process). In the system of the present invention, in contrast, the interface is dynamic: at runtime the system represents in the interface the data which is most important to the user. In other words, the present invention dynamically alters the user interface at runtime to include representations of information which is important to the user.

The approach adopted by the present invention is to present an interface comprising a background bitmap and further comprises diverse objects which are "plugged into" the background. Each object which is plugged in is typically a completely separate object which represents particular user data which is of interest to the currently logged-on user. Additionally, the system permits multiple background bitmaps or landscapes so that the user may select a preferred representation. For example, the user can select an urban setting, a country setting, a cartoon setting, or the like. The system, in turn, automatically adapts the objects placed on the landscape for the particular background setting which the user has chosen. Additionally, the user can select completely different landscape environments. For example, the user might select a business landscape for representing his or her data. In response, the system (based on the user's actual data) regenerates the appropriate objects which are plugged into the landscape for representing the user's own data.

The above-described approach of the present invention may be employed to any one of a variety of environments. Consider, for instance, the need to track travel information (e.g., in a travel agency environment). In such an application, the Databank would store travel-related information, such as flights, travel plans, destinations, and the like. Accordingly, the landscape would illustrate those data items of interest using objects which are quite different than those shown for the family-based system above. For instance, a travel-related landscape might include objects indicating flights (e.g., airplane object), destinations (e.g., icons of popular destinations), and the like.

Thus employing this approach, it is far easier for the user to adapt to a graphic interface—a graphic landscape—as the user already has an idea of what underlies the interface. When a user enters an application program for the very first time, he or she does not already know how to interact with the application to get to that which is desired—the user's own data. The approach of the present invention is to build a live representation of the user's data—whatever that data is—instead of building a representation of an application's functionality. By adopting the user's very own data objects to represent the interface, instead of an abstract set of program codes or modules underlying the interface, the system provides an interface which the user is already familiar with.

Figure 8:
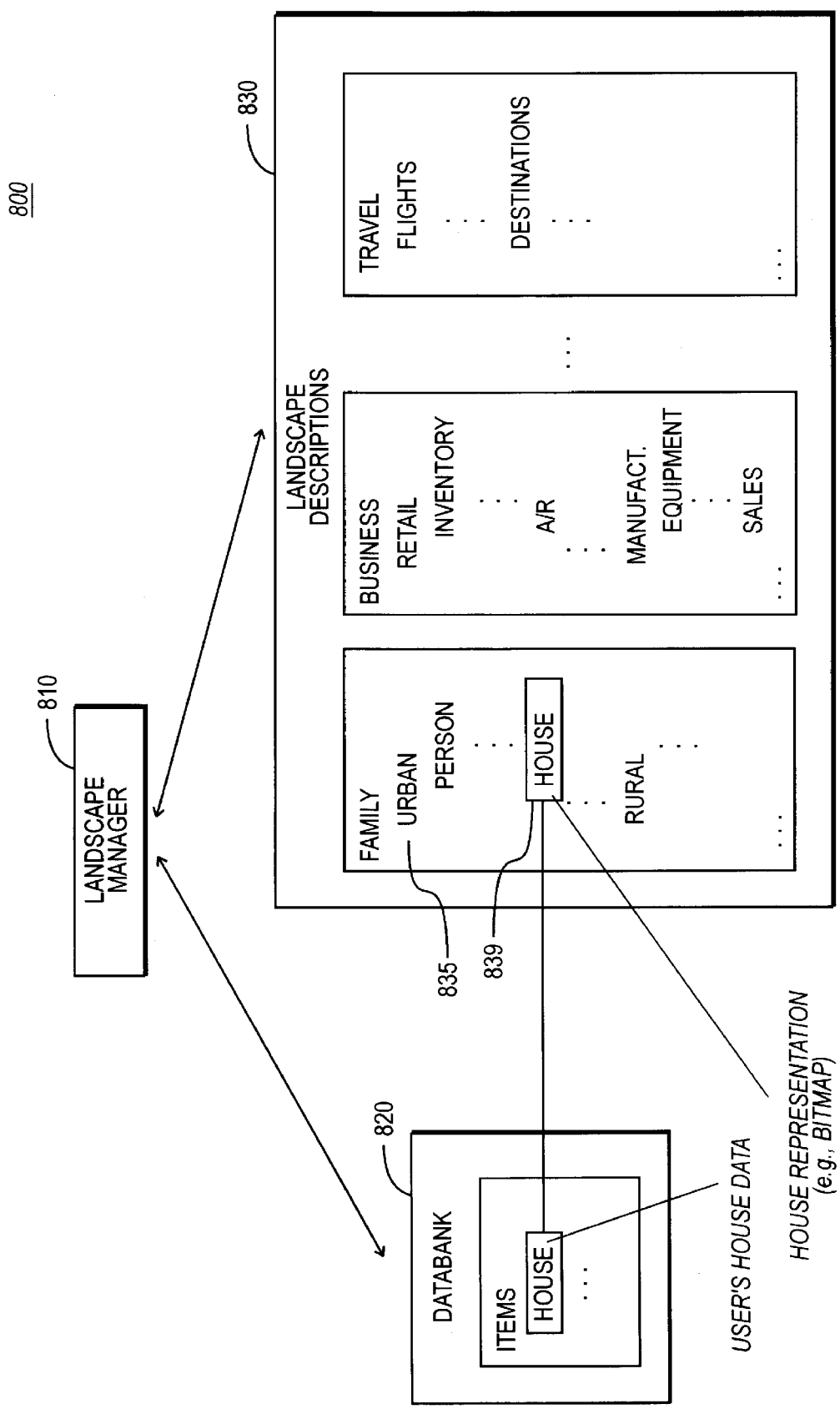
FIG. 8 is a block diagram of the main components supporting the user data-based interface.

FIG. 8 provides a block diagram 800 view of the main components supporting the user data-based interface. These components comprise a Landscape Manager 810, a Databank 820, and a Landscape Descriptions Module 830. The Landscape Manager 810, which directs the overall process, manages displaying of the interface and dispatching and processing of events occurring in the system. The Landscape Manager 810 utilizes the Databank 820 to gain access to those items which represent the user's actual data. In operation, the Landscape Manager 810 scans through the Databank table for determining items of the user's own data. An "item" can represent anything from a car, to a house, to a person, or the like; or in a different setting, an "item" could represent a flight, a trip, a destination, or the like. "Items," which vary from one context to another, are those core data objects which anchor the user's data. These are the types of objects which the user would, if following his or her own intuition, employ to look up information. In a corresponding manner, indexes created on Databank tables are generally created on these "items."

Also shown, the Landscape Manager utilizes the Landscape Descriptions Module 830. The Module 830 stores a set of "landscapes." Suppose, for instance, that the Information Management System is configured to model a family which lives in a suburb. Given that a house is stored as an item in the Databank 820, and given an urban landscape (shown at 835), the system employs House Description 837 for representing this user data in an interface. The House Description 837 includes information indicating what is displayed on screen (e.g., house bit map), where it is displayed, and what order it is displayed. By storing information about the order in which items are displayed, the system may avoid, for instance, displaying a house bit map image on top of a person bit map image; instead, the person bit map image is rendered on top of the house bit map image. In effect, the Databank answers the question: What items the user has? The Landscape Descriptions Module answers the question: How is each item displayed to the user on screen?

For a given set of data, what the system displays depends on the current landscape description in use. Consider a credit card "item" stored in the Databank. Such an item would not be represented by a bitmap object in the "family" view of the user's data. The user might, however, then select a financial landscape from the Landscape Descriptions Module 830. In a financial landscape, items such as credit cards and bank accounts are appropriate items to represent as individual objects in the landscape. Thus, manifestation of particular objects in the user interface depends on what data items the user has created and what representation or landscape the user desires of those items. Moreover, not only does the landscape provide esthetics to the interface, but it also acts to filter the user information into only those types of objects (e.g., financial) which the user currently desires to view.

Actual look up of an item in the landscape description module occurs in an hierarchical fashion. Suppose, for instance, that the user has a pet dog. The system will look in the description to determine whether a representation for a dog exists. If not, the system will proceed up the hierarchy to a pet. Similarly, when looking for a representation of a boy, if the system finds none, it will proceed up the hierarchy to a child. If a representation for the child is not available, the system will proceed up the hierarchy to a person. In this fashion, the system is able to provide representations for items without storing a detailed representation of each type (and subtype) of possible items.

Figure 9A:
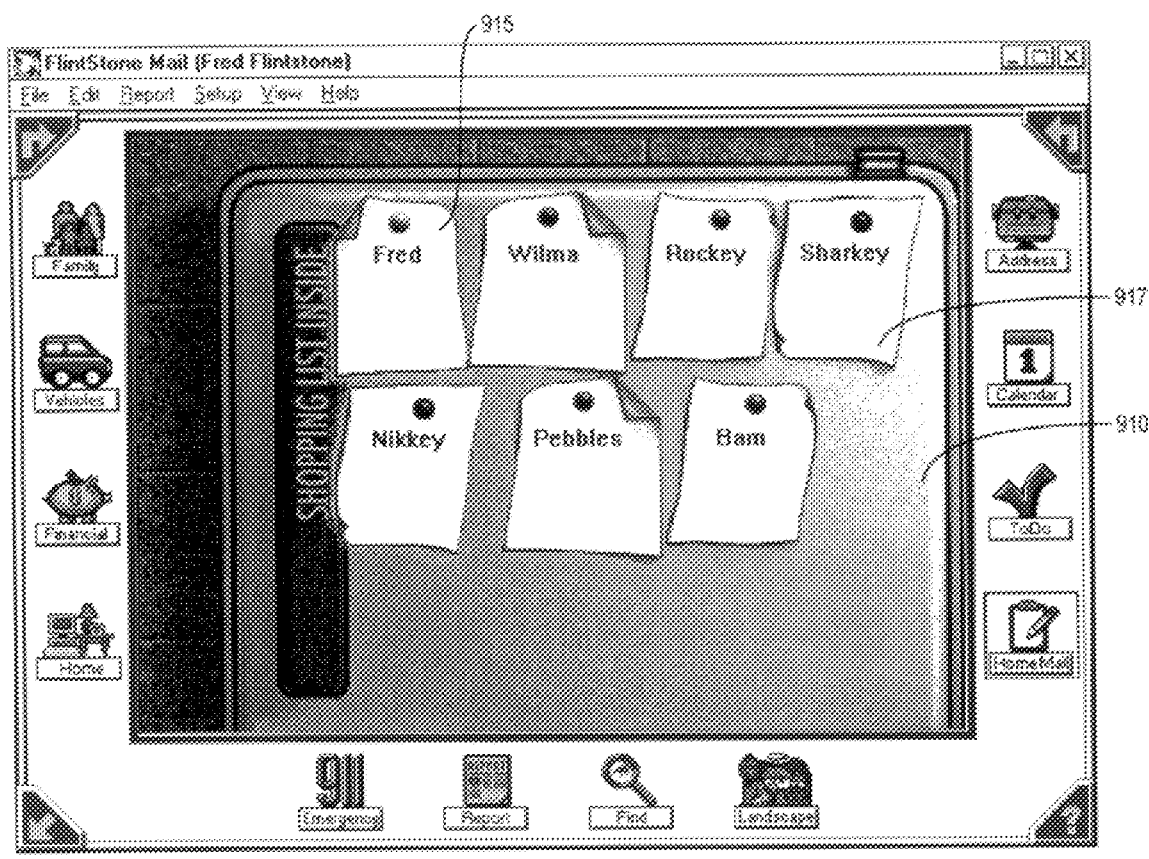
FIGS. 9A–C are bitmap screenshots illustrating a family mail landscape ("frig mail"), which demonstrates use of a different landscape for a single set of data.
Figure 9B:
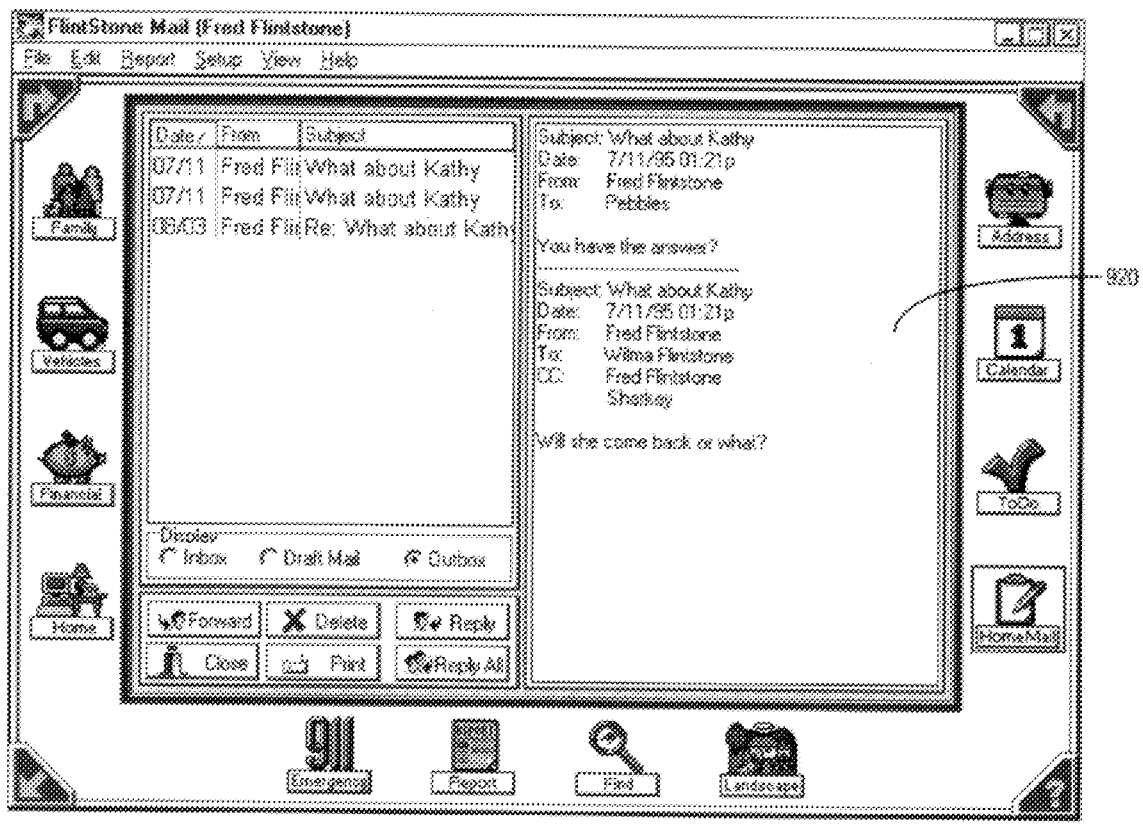
Figure 9C:
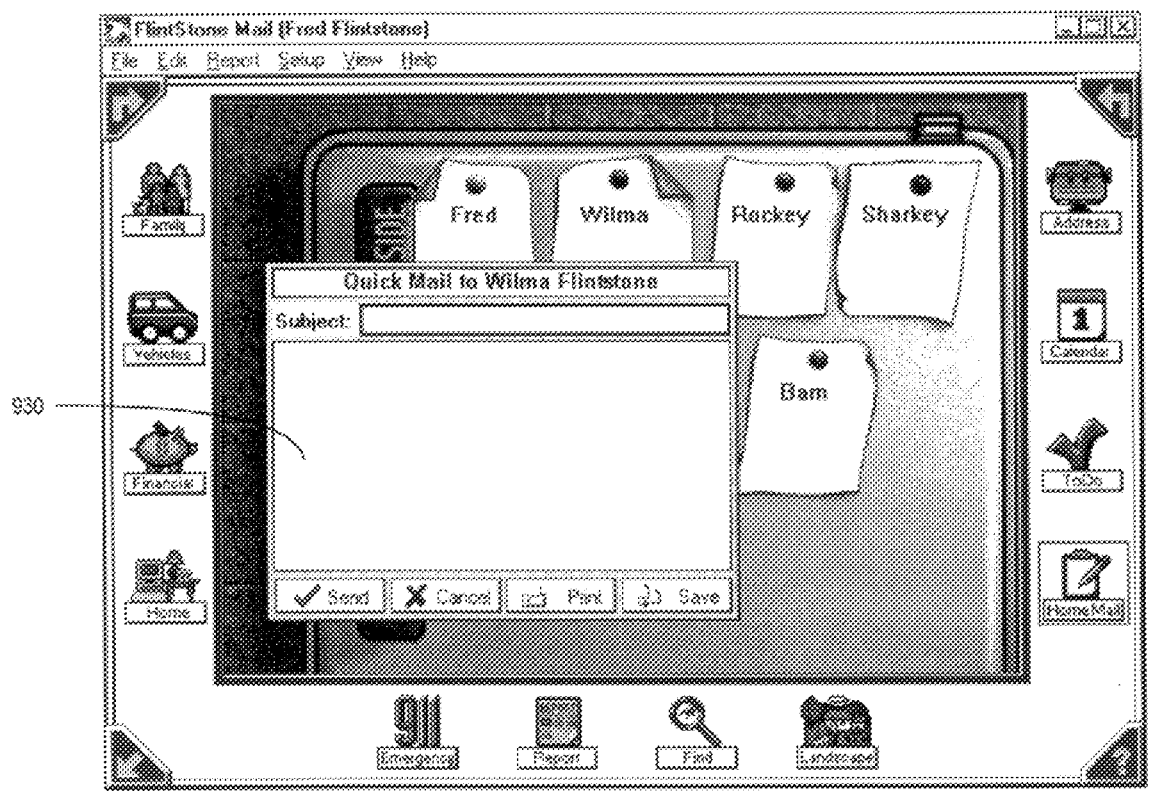

FIGS. 9A–C illustrate use of a different landscape within the context of modeling family or personal information. FIG. 9A presents a mail landscape 910, using the paradigm of a refrigerator where individuals post notes ("frig mail"). Depending on the data in the Databank, the landscape shows screen representations of items in a Databank which are of interest to the user, persons in the household for the example at hand. With the same set of underlying data in the Databank, the system presents a different representation of that data—one in the context of a mail center. Further, the action of each object on each landscape is determined, in part, by the identity of the user currently logged on. For instance, if the user clicks on a representation of his or her own name (e.g., the "Fred" note indicated at 915), the system displays an editor including appropriate data items for the user in this context, here an email editor for that user. This is shown in particular detail by the display 920, in FIG. 9B.

If, on the other hand, the user selects the note for another user (e.g., note 917), then the system displays an appropriate dialog for interacting with the other user. This is illustrated by the "quick mail" dialog 930, shown in FIG. 9C. Note, in particular, that the action invoked upon selection of an item in the landscape is not static. Instead, the particular data item and editor invoked also depends upon the context of which "user" is currently logged on to the system. Note also that the mail center landscape filters from view those data items which are not relevant to the current context (e.g., pet is not relevant in the context of email).

B. Construction of a preferred embodiment

The following description will focus on construction of a preferred embodiment, which is implemented in Borland's Object Pascal using Borland's Delphi. Documentation of Object Pascal and a suitable compiler/linker for Object Pascal source code (Borland's Delphi) is available from Borland International of Scotts Valley, Calif. (Part No. HDB1110WW41180). Construction of the system and its methods is perhaps best undertaken by examining the Object Pascal classes employed to construct a preferred embodiment.

THitBMP is an Object Pascal class which serves as a container for the background bitmap. An object of type THitBMP builds the background and builds all of the objects placed in that bitmap. It also maintains a second bitmap which is employed to allow the system to determine which particular object is being selected for a given mouse click event. The THitBMP class may be constructed as follows:

```
THitBMP = class(TObject)
    ItemHit: PLList;
    width: integer;
    height: integer;
    HitProc: THitProc;
    BMPList1: TList;
    BMPList2: TList;
    ButtonDown: TBMP;
    ButtonIndex: integer;
    constructor Create(w, h: integer);
    destructor Destroy;
    function GetByte(x, y: integer) : byte;
    procedure SetByte(x, y: integer; value: byte);
    procedure MatrixCopy( bmpn:TBitmap; Posx, Posy:integer;
        Color: TColor; cmd: byte);
    procedure MouseDown(x, y: integer);
    procedure MouseUp(x, y: integer);
    procedure MouseMove(x, y: integer);
    procedure DoButtonUp;
    procedure HitCommand(cmd: byte);
    function GetTBMP(cmd: byte) :TBMP;
    property Bytes[x, y: integer] : Byte read GetByte write SetByte;
end;
```

As shown, the class inherits from TObject. This is a Borland Delphi standard class, which is documented in the manuals accompanying Borland's Delphi. TObject simply provides standard functionality to Delphi-created applications.

The members of THitBMP class are as follows. ItemHit is an array of pixel lines used for determining which object has been "hit." This is the manner in which access is gained to the second (background) bitmap. width and height indicate the size of the landscape. In a preferred embodiment, however, the landscape may include (at this level) the outer frame. HitProc is a callback procedure which indicates action undertaken in the event of a hit. The particular HitProc for the mail landscape, for instance, would be different than that employed for the family (generic) landscape. Thus for either case, HitProc specifies a handler for the hit event. BMPList1 and BMPList2 maintain a list of items which are placed in the landscape. This includes the icons, houses, persons, and the like.

ButtonDown is an object of class TBMP. This is employed for processing the states of a screen object (e.g., mouse button down and mouse button up). This contains the object for which the user is depressing the mouse button for, yet before the HitProc is invoked. When the system receives a mouse button up event, it checks to see whether the then current bitmap is the same as the bitmap for when the mouse button was depressed (i.e., the object which was first hit). ButtonIndex, an integer, is employed for indexing into the BMPLists.

The data members of the THitBMP class are followed by the prototypes for procedures and functions of the class. Create is a constructor for the class; destroy is a destructor for the class. Each is implemented as follows:

```
{THitBMP}
constructor THitBMP.Create(w, h: integer);
var x: integer;
begin
    ButtonIndex := SysCmdNoop;
    Width := w;
    Height := h;
    GetMem(ItemHit, Width * sizeof(Pointer));
    for x := 0 to Width - 1 do
    begin
        GetMem(Itemhit^[x], Height);
        FillChar(Itemhit^[x]^[0], Height, sysCmdNoop);
    end;
end;
destructor THitBMP.Destroy;
var x: integer;
begin
    if ItemHit <> nil then
    begin
        ButtonDown := nil;
        for x := 0 to Width - 1 do
        begin
            if ItemHit^[x] <> nil then
                FreeMem(ItemHit^[x], Height);
        end;
        FreeMem(ItemHit, Width * sizeof(Pointer));
        ItemHit := nil;
    end;
end;
```

GetByte and SetByte facilitate the setting of properties for objects instantiated from this class, using Borland's Delphi property setting mechanism. Each may be implemented as follows.

```
function THitBMP.GetByte(x, y: integer) : byte;
begin
    {if (x >= 0) and (x < width) and (y >= 0) and (y < Height) then}
        result := ItemHit^[x]^[y];
end;
procedure THitBMP.SetByte(x, y: integer; value: byte);
begin
    {if (x >= 0) and (x < width) and (y >= 0) and (y < Height) then}
        ItemHit^[x]^[y] := value;
end;
```

The MatrixCopy method of THitBMP copies a physical bitmap into a logical array of bits:

```
procedure ThitBMP.MatrixCopy(bmpn:TBitmap; Posx, Posy:integer;
        Color: TColor; cmd: byte);
var x,y :integer;
begin
    for y := 0 to bmpn.Height - 1 do
    begin
        for x := 0 to bmpn.Width - 1 do
        begin
            if bmpn.Canvas.Pixels[x, y] <> Color then
            begin
                if (x + PosX < Width) and (y + PosY < Height) then
                    Bytes[x + PosX, y + PosY] := cmd;
            end;
        end;
    end;
end;
```

This allows bitmap images (e.g., of landscape objects) to be transferred from underlying bitmap templates into the landscape display to the user at runtime.

MouseDown and Mouse Up are handler functions which process mouse down and mouse up events. In a similar manner, MouseMove processes Windows mouse move events. Each is implemented as follows.

```
procedure THitBMP.MouseDown (x,y: integer);
var p: byte;
    t: TBMP;
begin
    DoButtonUp;
    if (x >= 0) and (x < width) and (y >= 0) and (y < height) then
    begin
        p := Bytes[x, y];
        if (p <> SysCmdNoop) then
```

```
        begin
            t := GetTBMP(p);
            if (t <> nil) and (t.iBMPStatus <> BSDisabled) then
            begin
                if t.iBMPCount = 1 then
                begin
                    HitCommand(p)
                end
                else
                begin
                    if t.iBMPType = BTStayDown then
                        HitCommand(p)
                    else
                        t.BtnDown;
                end;
            end;
        end;
    end;
    procedure THitBMP.MouseUp(x,y: integer);
    var p:byte;
        t: TBMP;
    begin
        if ButtonDown <> nil then
        begin
            DoButtonUp;
            p := ItemhitBMP.bytes[x, y];
            t := GetTBMP(p);
            if (t <> nil) and (t.iBMPstatus <> BSDisabled) and
                (p <> SysCmdNoop) then
                HitCommand(p);
        end;
    end;
    procedure THitBMP.MouseMove(x, y: integer);
    begin
        if (x >= 0) and (x < width) and (y >= 0) and (y < height) then
            if ButtonIndex <> ItemHitBMP.Bytes[x,y] then DoButtonUp;
    end;
```

DoButtonUp, a THitBMP class method which is invoked by the above methods, forces a button "up" which is otherwise in the down position.

```
procedure THitBMP.DoButtonUp;
begin
    if ButtonDown <> nil then
    begin
        with ButtonDown do
        begin
            BtnUp;
            DrawNow(iImage.Picture.Bitmap, iBMPx, iBMPy, iBMPw, iBMPh);
        end;
        ButtonDown := nil;
    end;
end;
```

This is employed, for instance, when the screen cursor is moved out of the boundary of an object while the mouse button is depressed (but before it is released).

HitCommand is a a THitBMP class method which is invoked upon occurrence of a hit.

```
        procedure THitBMP.HitCommand(cmd: byte);
        begin
            if Assigned(HitProc) then
                HitProc(cmd);
        end;
```

As shown, it in turn simply invokes the callback (i.e., the object's HitProc) for the object which is being hit. The HitCommand function is invoked with the command byte which was registered with a particular bitmap (object) during invocation of the MatrixCopy function.

This command byte is used to call GetTBMP—a method which returns detailed information about the current object being hit:

```
    function THitBMP.GetTBMP(cmd: byte): TBMP;
        function GetBMP(list: TList) : TBMP;
        var x: integer;
        begin
            result := nil;
            if list <> nil then
            begin
                for x := 0 to List.count - 1 do
                    if TBMP(list.Items[x]).iIndex = cmd then
                    begin
                        result := TBMP(list.Items[x]);
                        break;
                    end;
            end;
        end;
    begin
        result := GetBMP(BMPList1);
        if result = nil then
            result := GetBMP(BMPList2);
    end;
```

As shown, the method calls into a nested method, GetBMP, to enumerate this information.

Finally, Bytes is a function which is simply a different syntactical version of GetByte and SetByte functions. This is a Delphi construct which facilitates the task of getting and setting property values.

The actual objects which reside on the landscape bitmap (e.g., person, house, pet, and the like) are described by a TBMP class. Like THitBMP, the class inherits from Delphi's TObject base class. The TBMP class can be constructed as follows.

```
    TBMP = class(TObject)
        iBMPx, iBMPy: integer;
        iBMPw, iBMPh: integer;
        iBMPsize: integer;
        iBMPType: integer; {0 = Button; 1 = Icon; 3 = Radiobutton}
        iBMPCount: integer;
        iBMPOld: TBitmap;
        iBMPRestore: TBitmap;
        iBMPParent: TBitmap;
        iBMPMaskcolor: TColor;
        iBMPList: array[TBMPStatus] of TPoint;.
        iBMPStatus: TBMPStatus;
        iIndex: integer;
        iImage: TImage;
        iHitBMP: THitBMP;
        constructor Create;
        destructor Destroy; override;
        function AddBMP(index: integer; nme: pChar;
            count: integer; image: TImage; HitBMP: THitBMP):boolean;
        procedure DrawNow(bmp: tBitmap; x, y, w, h:integer);
        procedure DrawBitmap(Status: TBMPStatus; draw: boolean);
        procedure BTNDown;
        procedure BTNUp;
        procedure BTNDelete;
        procedure BTNDisable;
        procedure BTNSave;
        procedure BTNRestore;
        function GetImageDC: THandle;
        property ImageDC: THandle read GetImageDC;
    end;
```

The TBMP class members (iBMP-) function as follows. The x and y members describe the position of the object, and w and h describe width and height of the object on screen. Size stores the size of the bitmap. Type stores the type of the object, which may include button, icon, and radiobutton. Count stores the count of how many bitmaps are in the set for the current object (e.g., count of two for an object which stores both button up and button down bitmap images).

The next members are TBitmap data members which are employed for runtime rendering of the bitmap. Restore, for instance, stores the bitmap for restoring the screen image (e.g., when it is overwritten by another object, such as a dialogue box). MaskColor stores a value indicating the background color of the mask; this allows the bitmap image to be stored in a master bitmap without storing a mask version of that object (such as commonly done for bitmap icons).

List stores a list of the current status. An icon, for instance, may have three bitmaps, including up, down, and disabled. The List array stores an array indicting which bitmap of the object goes with a particular status. In other words, it indicates where in the master bitmap each of the versions for the object resides. Recall from above that it is known the width and height of the bitmap (from w and h above). Additionally, it is known the position on screen where the bitmap is to be rendered, from x and y data members. The list, therefore, serves as an index into the master bitmap, whereupon the appropriate bitmap for the object at its current version can be retrieved and rendered on screen. Status itself stores the current status of the object. Generally, this will be set to up, down, and disabled. Index stores an index and, thus, is used for housekeeping purposes.

Image is a data member of TImage, a Delphi type. Effectively, this provides a handle to the context in which the program is painting or rendering objects. HitBMP is the second or hit bitmap which is employed for hit testing as previously mentioned.

Create and Destroy are constructor and destructor for the class, respectively. Each may be created as follows:

```
{TBMP}
constructor TBMP.Create;
begin
   TObject.Create;
end;
destructor TBMP.Destroy;
begin
   {if iHitBMP <> nil then
   begin
      with iHitBMP do
         if ButtonDown = self then ButtonDown := nil;
   end;}
   if iBMPOld <> nil then iBMPOld.destroy;
   if iBMPRestore <> nil then iBMPRestore.destroy;
   inherited destroy;
end;
```

The constructor simply invokes the constructor for its parent, TObject. The destructor, on the other hand, frees up bitmaps, namely BMPOld and BMPRestore.

AddBMP adds a bitmap to the TBMP object which has been created.

```
function TBMP.AddBMP(index: integer; nme:pChar;
 count: integer; image: TImage; HitBMP: THitBMP) :boolean;
var x, c: integer;
 tp, tpWin:TBitmap
 str: array [0..255] of char;
 cnt: integer;
 w, h: integer;
 function dim(i: integer) :integer;
 begin
    if i = 0 then result := 1
       else result := i * (iBMPSize shr 2) div 25;
 end;
 function GetInt: integer;
 var i: integer;
 begin
   inc(cnt);
   GetIntToken(str, count, cnt, i);
   result := i;
 end;
begin
 iHitBMP := HitBMP;
 iImage := Image;
 result := false;
 cnt := 0;
 if nme <> nil then
 begin
   GetString(Style, nme, @str, 255);
   if isString(str) then
   begin
     iBMPParent := GetStyleBitmap;
     iBMPMaskColor := StyleMask;
   end
   else
   begin
     GetString(SecDefault, nme, @str, 255);
     iBMPParent := GetDefaultBitmap;
     iBMPMaskColor := DefaultMask;
   end;
 if isString(str) then
 begin
 {x, y, %, BUTTON = 0/ICON = 1, w, h, # of versions (1 or 2),x1, y1, x2, y2}
   iBMPx := GetInt;
   iBMPy := GetInt;
   iBMPSize := GetInt;
   iBMPType := GetInt;
   w := GetInt;
   h := GetInt;
   iBMPw := dim(w);
   iBMPh := dim(h);
   iBMPCount := GetInt;
   with iBMPList[BSUp] do
   begin
     x := GetInt;
     y := GetInt;
   end ;
   if iBMPCount > 1 then
     with iBMPList[BSDown] do
     begin
       x := GetInt;
       y := GetInt;
     end;
   if iBMPCount > 2 then
     with iBMPList[BSDisabled] do
     begin
       x := GetInt;
       y := GetInt;
     end;
   if iBMPSize = 0 then iBMPSize := 100;
 end;
 with iImage do
 begin
   if iBMPx < 0 then
     iBMPx := width + iBMPx;
   if iBMPy < 0 then
     iBMPy := height + iBMPy;
 end;
 if str[0] <> chr(0) then
 begin
   if iBMPParent <> nil then
     begin
       tpWin := iImage.Picture.Bitmap;
       iBMPOld := CreateCopy(tpWin, iBMPx, iBMPy, iBMPw, iBMPh);
       with iBMPList[BSUp] do
         tp := CreateCopy(iBMPParent, x, y, w, h);
       if tp <> nil then
       begin
         MaskCopy(tpWin.canvas, rect(iBMPx, iBMPy, iBMPx+iBMPw-1, iBMPY+iBMPh-1),
```

```
        tp, rect(0, 0, w-1, h-1), iBMPMaskColor, false);
      HitBMP.MatrixCopy(tp, iBMPx, iBMPy, iBMPMaskColor, index);
      DrawNow(tpWin, iBMPx, iBMPy, w, h);
      result := true;
      tp.Destroy;
    end;
   end;
  end;
 end;
end;
```

In essence, the constructor for TBMP creates an empty bitmap, then the call to AddBMP adds a bitmap to that empty bitmap, adding one object at a time.

DrawNow is a method for rendering the bitmap now—a method which causes the bitmap to draw itself.

```
procedure TBMP.DrawNow(bmp: tBitmap; x, y, w, h:integer);
var r: TRect;
begin
  with iImage do
    begin
      if parent.showing then
        begin
          r := Rect(x, y, w + x - 1, h + y - 1);
          InvalidateRect(parent.handle, @r, false);
          UpdateWindow(parent.handle);
        end;
    end;
end;
```

The DrawBitmap, on the other hand, causes the bitmap to draw itself with a particular status, as specified by the TBMP status parameter, TBMPStatus.

```
procedure TBMP.DrawBitmap(Status: TBMPStatus; draw: boolean);
var BMPSave, BMPNew, BMPMask, BMPWin: TBitmap;
    dc, dcMono: THandle;
    hMono, hOldBMP, holdMask: THandle;
  function MergeBMP(SourceBMP: TBitmap; pt: TPoint) :TBitmap;
  begin
    result := CreateCopy(iBMPOld, 0, 0, iBMPw, iBMPh);
    with pt, SourceBMP do
      MaskCopy(result.Canvas, rect(0, 0, iBMPw, iBMPh),
          SourceBMP, rect(x, y, x + iBMPw, y + iBMPh),
          iBMPMaskColor, false);
  end;
begin
  BMPMask := nil;
  BMPSave := nil;
  BMPNew := nil;
  BMPWin := iImage.Picture.Bitmap;
  if iBMPRestore = nil then
    iBMPRestore := CreateCopy(BMPWin, iBMPx, iBMPy, iBMPw, iBMPh);
  BMPMask := CreateCopy(BMPWin, iBMPx, iBMPy, iBMPw, iBMPh);
  BMPSave : = MergeBMP(iBMPParent, iBMPList[BSUp]);
  BMPNew := MergeBMP(iBMPParent, iBMPList[Status]);
  BitBlt(BMPMask.canvas.handle, 0, 0, iBMPw, iBMPh,
          BMPSave.canvas.handle, 0, 0, $990066);
  SetTextColor(BMPMask.canvas.handle, $0);
  SetBkColor(BMPMask.canvas.handle, $FFFFFF);
  hMono := CreateBitmap(iBMPw, iBMPh, 1, 1, nil);
  dcMono := CreateCompatibleDC(0);
  hOldBmp := SelectObject(dcMono, hMono);
  BitBlt(dcMono, 0, 0, iBMPw, iBMPh,
          BMPMask.canvas.handle, 0, 0, SRCCOPY);
  BitBlt(BMPMask.canvas.handle, 0, 0, iBMPw, iBMPh,
          BMPNew.canvas.handle, 0, 0, SRCCOPY);
  BitBlt(BMPMask.canvas.handle, 0, 0, iBMPw, iBMPh,
          dcMono, 0, 0, MERGEPAINT);
  BitBlt(BMPWin.Canvas.handle, iBMPx, iBMPy, iBMPw, iBMPh,
          dcMono, 0, 0, SRCPAINT);
  BitBlt(BMPWin.Canvas.handle, iBMPx, iBMPy, iBMPw, iBMPh,
          BMPMask.Canvas.handle, 0, 0, SRCAND);
  if Draw then
    DrawNow(BMPWin, iBMPx, iBMPy, iBMPw, iBMPh);
  SelectObject(dcMono, hOldBmp);
  DeleteDC(dcMono)
  DeleteObject(hMono);
  if BMPSave <> nil then
    BMPSave.Destroy;
  if BMPNew <> nil then
    BMPNew.Destroy;
  if BMPMask <> nil then
    BMPMask.Destroy;
end;
```

This is followed by a series of button methods: BtnDown, Btn Up, BtnDelete, BTNDisable, BTNSave and BTNRestore. Their functionality is described by their respective names.

```
procedure TBMP.BtnDown;
begin
    if iHitBMP <> nil then
        iHitBMP.DoButtonUp;
    if TBMPStatus(iBMPCount) > BSDown then
    begin
        if(iHitBMP <> nil) and(iBMPType <> BTStayDown) then
        begin
            with iHitBMP do
            begin
                ButtonDown := self;
                ButtonIndex := iIndex;
            end;
        end;
        DrawBitmap(BSDown, true);
        iBMPStatus := BSDown;
    end;
end;
procedure TBMP.BtnUp;
begin
    if iBMPRestore <> nil then
    begin
        BitBLT(ImageDC, iBMPx, iBMPy, iBMPw, iBMPh,
                iBMPRestore.canvas.handle, 0, 0, SRCCOPY);
        iBMPRestore.Destroy;
        iBMPRestore := nil;
        if iHitBMP <> nil then
        begin
            with iHitBMP do
            begin
                if ButtonDown = self then ButtonDown := nil;
                if ButtonIndex = iIndex then ButtonIndex := SysCmdNoop;
            end;
        end;
        iBMPStatus := BSUp;
    end;
end;
procedure TBMP.BtnDelete;
begin
    BtnUp;
    if iBMPOld <> nil then
    begin
        BitBlt(ImageDC, iBMPx, iBMPy, iBMPw, iBMPh,
                iBMPOld.canvas.handle, 0, 0, SRCCOPY);
    end;
end;
procedure TBMP.BTNSave;
begin
    BtnUp;
    iBMPRestore := CreateCopy(iImage.Picture.Bitmap, iBMPx, iBMPy, iBMPw,
iBMPh);
end;
procedure TBMP.BTNRestore;
begin
    BtnUp;
end;
procedure TBMP.BTNDisable;
var tpMask, tpWin: TBitmap;
    dc, dcMono: THandle;
    hMono, hOldBMP, holdMask: THandle;
begin
    BtnUp;
    if TBMPStatus(iBMPCount) > BsDisabled then
        DrawBitmap(BSDisabled, false)
    else if TBMPStatus(iBMPCount) > BSDown then
        DrawBitmap(BSDown, false);
        iBMPstatus := BsDisabled;
end;
```

GetImageDC is simply a method for returning the windows device context into which the bitmap is drawn.

```
function TBMP.GetImageDC: THandle;
begin
    result := iImage.Picture.Bitmap.Canvas.handle;
end;
```

Finally, ImageDC is a property construct employed for processing the image device context (DC) property.

TItem class is a class derived from the TBMP class. In an exemplary embodiment, it may be constructed as follows:

```
TItem = class(TBMP)
public
    iTag: pChar;
    iTitle: pChar;
    iName: pChar;
    iCatNo: integer;
    iChanged: boolean;
    iRecNo: LongInt;
    MailBMP: TBMP;
    User: TUser;
    constructor Create;
    destructor Destroy; override;
    function Load(index: integer) :boolean;
    function Attach:boolean;
    function AddBitmap(index:integer) :boolean;
    function AddUser: boolean;
end;
```

TItem inherits all of TBMP's data members and methods. In addition, TItem adds the functionality related to the Databank. In essence, the TBMP class provides basic bitmap functionality (e.g., rendering a bitmap on screen) to which TItem adds Databank functionality.

The members of the TItem class are as follows: Tag serves as an identifier or tag for the particular object instantiated from the TItem class. Title is the title for the object, expressed as a null-terminated string. Title is used, for instance, as the caption in Navigator dialogs. Name is a string which serves as the name stored for the item in the Databank.

CatNo is the category number of the item. As described previously, items are arranged in a hierarchical fashion, into categories. Category number, therefore, indicates in a shorthand fashion where in a hierarchy the item exists. In an exemplary environment, category numbers may include one of the following values:

```
            cItem =          1000;
            cPerson =        2900;
            cAdult =         2200;
            cWoman =         2100;
            cMan =           2000;
            cChild =         2500;
            cGirl =          2400;
            cBoy =           2300;
            cToddler =       2450;
            cPet =           3900;
            cDog =           3100;
            cCat =           3200;
            cBird =          3300;
            cVehicle =       4900;
            cCar =           4000;
            cMotorcycle =    4100;
            cBoat =          4200;
            cPlane =         4300;
            cHouse =         5900;
            cHome =          5000;
            c2ndHome =       5100;
```

Changed is a Boolean, indicating whether the item has been changed and, thus, an indicator of whether the item should be stored (updated) in the Databank before being destroyed. RecNo stores the record number of the underlying record in the Databank. MailBMP references a bitmap for use with mail; it is included for performance reasons. User is a data member of type TUser. It stores information about a particular user, such as password, whether mail is pending, or the like.

Following these data members are the methods for the TItem class. Its constructor and destructor, create and destroy, may be constructed as follows:

```
{TItem}
constructor TItem.Create;
begin
    TBMP.Create;
    iTag := StrAlloc(szTag + 1);
    iTag[0] := char(0);
    iName := StrAlloc(szBitmap + 5);
    iName[0] := char(0);
    iTitle := StrAlloc(szTitle + 1);
    iTitle[0] := char(0);
    iChanged := false;
end;
destructor TItem.Destroy;
begin
    StrDispose(iTag);
    StrDispose(iName);
    StrDispose(iTitle);
    if MailBMP <> nil then
        MailBMP.Destroy;
    inherited destroy;
end;
```

As shown, each performs housekeeping (e.g., string memory allocation and de-allocation) associated with object creation and destruction.

Load is a method which copies information about the item from the Databank into the object:

```
function TItem.Load(index:integer) :boolean;
var len:integer;
    str: array[0..128] of char;
begin
    result := false;
    if len <> 0 then
    begin
        with DataDB do
        begin
            iIndex := index;
            iCatNo := cItem;
            iRecNo := dbRecNo;
            StrLCopy(str, dbGetData('CLASS'), 127);
            if Str[0] <> chr(0) then
                iCatNo := CatNo(str);
            StrLCopy(iTitle, dbGetData('TITLE'), szTitle - 1);
            result := true;
        end;
    end;
end;
```

Attach is a method which attaches the item to a global list of items:

```
function TItem.Attach:boolean;
var x:integer;
begin
    x := 0;
    with Itemlist do
    begin
        for x := 0 to Count - 1 do
            if (TItem(Items[x]).iCatNo > iCatNo) then
                break;
        Insert(x, self);
```

```
        result := true;
    end;
end;
```

In essence, this is a method which serves to register the item with the system. The global list of items is used for housekeeping purposes, such as constructing global lists of items (e.g., pick list of users).

AddBMP is a method which adds the bitmap for the current item to the landscape.

```
function TItem.AddBitmap(index:integer) :boolean;
var cno, cgrp, i, x, c: integer;
    str: pchar;
    st: string[20];
    done: boolean;
    rct: TRect;
const
    mailname: pChar = 'Mail000';
begin
    result := false;
    str := StrAlloc(256);
    strCopy(str, iName);
    if str <> nil then
    begin
    {All this stuff is to find the
    correct bitmap name}
        if str[0] = char(0) then
        begin
            cno := iCatNo;
            repeat
                x := 0;
                cgrp := 1;
                while x <> index do
                begin
                    c := TItem(ItemList.Items[x]).iCatNo;
                    while (c <> cItem) and (c <> cno) do c := CatPNo(c);
                    if c = cno then cgrp := cgrp + 1;
                    x := x + 1;
                end;
                done := AddBMP(index, CatName(cno), cgrp,
                    window.BMPLandscape, ItemHitBMP);
                cno := CatPNo(cno);
            until (cno = cItem) or (cno = 0) or done;
            cno := iCatNo;
            done := false;
            x := 1;
            if IsInCategory(iCatNo, cPerson) then
            begin
                MailBMP := TBMP.Create;
                with MailBMP do
                begin
                    MailName[4] := chr(0);
                    inc(MailNum);
                    NumName(MailName, MailName, MailNum, true);
                    done := AddBMP(index, MailName, 1,
                        window.BMPMail, MailHitBMP);
                    if done then
                    begin
                        for i := 0 to StrLen(iTitle) do
                        begin
                            if iTitle[i] in [chr(0), ' '] then break;
                            str[i] := iTitle[i];
                        end;
                        str[i] := chr(0);
                        with window.BMPMail.Picture.BitMap.Canvas do
                        begin
                            SetBKMode(handle, TRANSPARENT);
                            rct := Rect(iBMPx + 5, iBMPy + 30,
                                iBMPx + iBMPw - 5, iBMPy + iBMPh - 10);
                            DrawText(handle, str, -1,
                                rct,
                                DT_CENTER);
                            if user.MailPending = 0 then
                                st := 'No'
                            else
                                st := GetNumPString(user.MailPending);
                            StrPCopy(str, ' new messages');
                            {DrawText(handle, str, -1,
                                Rect(iBMPx + 5, iBMPy + 60,
                                    iBMPx + iBMPw - 5, iBMPy + iBMPh - 10),
                                DT_CENTER);}
                        end;
                    end
                    else
                    begin
                        Destroy;
                        self.MailBMP := nil;
                    end;
                end;
            end;
        end;
        StrDispose(Str);
    end;
end;
```

The method determines for the item, for instance, which bitmap to use and what position and order the bitmap receives on the landscape. Information about which items in particular are currently positioned in a landscape is stored from one session to another in a Windows .INI file (the format of which is widely documented, see e.g., Microsoft Windows SDK). The AddBitmap method employs this .INI information at runtime for determining where to render the bitmap on the landscape.

Finally, AddUser is a method which "adds" a user:

```
function TItem.AddUser;
var User: TUser;
    fldData: array[0..40] of char;
    i: integer;
begin
    if IsInCategory(iCatNo, cPerson) then
    begin
        User := TUser.Create;
        with User do
        begin
            Item := self;
            self.User := User;
            with DataDB do
            begin
                dbGoRec(iRecNo);
                GetFormData(iRecNo, fldPassword, ' ', fldData, 40);
                Password := Strpas(fldData);
                GetFormData(iRecNo, 'MailPending', ' ', fldData, 40);
                Val(Strpas(fldData), MailPending, i);
            end;
        end;
        UserList.Add(User);
    end;
end;
```

The method creates a TUser object, looks up the Databank data for the user (e.g., password, mail pending, and the like), and then adds the user to a global user list.

Attached hereto is an Appendix A containing Object Pascal source code listings, which provide further description of the present invention. A suitable compiler for compiling and linking the code is available from Borland International (Part No. HDB1110WW41180).

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

APPENDIX A

```
        unit Hbalbum;
        {$X+}

      interface uses  tabsnew, winprocs, wintypes, messages, classes, SysUtils,
        Graphics, ExtCtrls,
              hbreport, hb911, hbcat, hbinfo, hbutil,
              forms, controls, StdCtrls, BBtnNew, Grids;

type

LPixel = array[0..65200] of byte;
          PLPixel = ^LPixel;
          LList = array[0..MaxlistSize - 1] of PLPixel;
          PLList = ^LList;

         THitBMP = class;

TBMPStatus = (BSUp, BSDown, BSDisabled);

TBMP = class(TObject)
            iBMPx, iBMPy: integer;
            iBMPw, iBMPh: integer;
            iBMPsize: integer;
            iBMPType: integer; {0 = Button; 1 = Icon; 3 = Radiobutton}
            iBMPCount: integer;
            iBMPOld: TBitmap;
            {iBMPSave: TBitmap;
            iBMPDown: TBitmap;}
            iBMPRestore: TBitmap;
            iBMPParent: TBitmap;
            iBMPMaskColor: TColor;
            iBMPList: array[TBMPStatus] of TPoint;
            iBMPStatus: TBMPStatus;
            iIndex: integer;
            iImage: TImage;
 40         iHitBMP: THitBMP;

constructor Create;
            destructor Destroy; override;

45         function AddBMP(index: integer; nme: pChar;
              count: integer; image: TImage; HitBMP: THitBMP):boolean;
            procedure DrawNow(bmp: tBitmap; x, y, w, h:integer);
            procedure DrawBitmap(Status: TBMPStatus; draw: boolean);
            procedure BTNDown;
 50         procedure BTNUp;
            procedure BTNDelete;
```

```
                    procedure BTNDisable;
                    procedure BTNSave;
                    procedure BTNRestore;
                    function GetImageDC: THandle;
                    property ImageDC: THandle read GetImageDC;
                  end;

TUser = class;

                  TItem = class(TBMP)
                  public
                    iTag: pChar;
                    iTitle: pChar;
                    iName: pChar;
15                  iCatNo: integer;
                    iChanged: boolean;
                    iRecNo: LongInt;
                    MailBMP: TBMP;
                    User: TUser;
20
                    constructor Create;
                    destructor Destroy; override;

function Load(index:integer):boolean;
25                  function Attach:boolean;
                    function AddBitmap(index:integer):boolean;
                    function AddUser: boolean;
                  end;

                  TItemList = class(TList)
                  public
                    function LoadItem(n: word; data: Pointer): Boolean;
                  end;

                  TUser = class(TObject)
                    Password: string[20];
                    MailPending: integer;
                    Item: TItem;
                    procedure SaveData;
                  end;

TUserList = Class(TList)
                  end;

                  THitProc = procedure(cmd: byte);

THitBMP = class(TObject)
                    ItemHit: PLList;
                    width: integer;
                    height: integer;
                    HitProc: THitProc;
```

```
          BMPList1: TList;
          BMPList2: TList;
          ButtonDown: TBMP;
          ButtonIndex: integer;
 5        constructor Create(w, h: integer);
          destructor Destroy;
          function GetByte(x, y: integer): byte;
          procedure SetByte(x, y: integer; value: byte);
          procedure MatrixCopy( bmpn:TBitmap; Posx, Posy:integer;
10                         Color: TColor; cmd: byte);
          procedure MouseDown(x, y: integer);
          procedure MouseUp(x, y: integer);
          procedure MouseMove(x, y: integer);
          procedure DoButtonUp;
15        procedure HitCommand(cmd: byte);
          function GetTBMP(cmd: byte):TBMP;
          property Bytes[x, y: integer]: Byte read GetByte write SetByte;
        end;

        const

ItemHitBMP: THitBMP = nil;
        MailHitBMP: THitBMP = nil;

        fldName:      pChar = 'Name';

maxItems = 200;
        maxViews = 12;
        maxPassword = 20;
        SysCmdExit      = maxItems + $01;
        SysCmdHelp      = maxItems + $02;
        SysCmdPrev      = maxItems + $03;
        SysCmdNext      = maxItems + $04;
        SysCmdFamily    = maxItems + $05;
        SysCmdVehicles  = maxItems + $06;
        SysCmdFinance   = maxItems + $07;
        SysCmdAssets    = maxItems + $08;
        SysCmdCalendar  = maxItems + $09;
        SysCmdToDo      = maxItems + $0A;
        SysCmdHome      = maxItems + $0B;
        SysCmdAddress   = maxItems + $0C;
        SysCmdFind      = maxItems + $0D;
        SysCmdReport    = maxItems + $0E;
        SysCmdEmergency = maxItems + $0F;
        SysCmdMail      = maxItems + $10;
        SysCmdClose     = maxItems + $11;
        SysCmdLogout    = maxItems + $12;

```

```
            SysCmdNoop  = $ff;

szTag = 20;

            ItemShow: TItem = nil;
            ItemAlbum: TItem = nil;

LSFrame: TFrame = nil;
            LSView: byte = 0;
            LSDisabled: boolean = false;

BTRegular  = 1;
            BTStayDown = 3;

UserList: TUserList = nil;
            CurrentUser: TUser = nil;

            fldPassword: pChar = 'gabledigabledigup';

BtnList: TItemList = nil;
            ItemList: TItemList = nil;

          var
            CenterXPos, CenterYPos, CenterWidth, CenterHeight: integer;
            MailNum, BMPWidth, BMPHeight: integer;
            {These are calculated at runtime to determine the position of
             the landscape (in order to allow the 'Business Desktop'}
   procedure LandscapeInit;
          procedure LandscapeExit;
          procedure LandscapeInnerFrame;

procedure LandScapeSelectView(p: byte);
          procedure LandScapeSysCommand(cmd: byte);
          procedure LSButtonDisable;
          procedure LSButtonEnable;
          function LSIsBasicCommand(c: byte): boolean;

procedure ShowInfo(cmd: byte);
          function HideInfo: boolean;
          {function HideAlbumDlg: boolean;} procedure AlbumInit;
          procedure AlbumLoadItems;
```

46

```
        procedure AlbumShowItems;
        procedure AlbumZapItems;

procedure AlbumGetCat(st: PChar;var filter: integer);
        procedure AlbumGetName(var st: PChar;var no: integer; filter: integer);
        procedure AlbumAttach(const pgename: string; Form: TForm; Panel: TPanel;
                              const title: string; AutoDestroy: boolean);
        procedure AlbumRemove;

        implementation uses  hbmain, hbmenu, hbexit, hbinit, hbdesk, hbdb, hbLogin,
              hbibox, hbform, hbDBank, hbcal, ctrlutil;
        var   SaveRect: TRect;
              BtnX, BtnY, BtnW, BtnH: integer;
              PForm: TForm;     {form for on-the-fly panels}
              PPanel: TPanel;   {on the fly panel};

{Utility stuff}

        function isEditControl(ctrl: TControl): boolean;
        begin
          result := ctrl.InheritsFrom(TEdit);
        end;
        function isWinControl(ctrl: TControl): boolean;
        begin
          result := ctrl.InheritsFrom(TWinControl);
        end;
        function isString(s: pChar): boolean;
        begin
          result := s[0] <> chr(0)
        end;
        function ItemName(index:integer):pChar;
        begin
          ItemNme[ItemNmeIndex] := chr(0);
          NumName(ItemNme, ItemNme, index, true);
          result := ItemNme;
        end;

function Str2Int(const st:string):integer;
        var i: integer;
            x: byte;
        begin
```

```
              i := 0;
              x := 1;
              while (x <= length(st)) and (st[x] = ' ') do inc(x);
              while (x <= length(st)) and (st[x] in ['0'..'9']) do
                begin
                  i := I * 10 + byte(st[x]) - byte('0');
                  inc(x);
                end;
              result := i;
            end;

function Int2Str(i:integer):string;
            const st:string[9] = '';
            var c: char;
            begin
              st := '';
              while i <> 0 do
              begin
                st := st + char((i mod 10) + byte('0'));
                i := i div 10;
              end;
              result := st;
            end;

25         {THitBMP}
            constructor THitBMP.Create(w, h: integer);
            var x: integer;
            begin
              ButtonIndex := SysCmdNoop;
 30           Width := w;
              Height := h;

GetMem(ItemHit, Width * sizeof(Pointer));

35           for x := 0 to Width - 1 do
              begin
                GetMem(Itemhit^[x], Height);
                FillChar(Itemhit^[x]^[0], Height, sysCmdNoop);
              end;
 40
            end;

destructor THitBMP.Destroy;
            var x: integer;
 45         begin
              if ItemHit <> nil then
              begin
                ButtonDown := nil;
                for x := 0 to Width - 1 do
                begin
                  if ItemHit^[x] <> nil then
```

48
```
              FreeMem(ItemHit^[x], Height);
           end;
           FreeMem(ItemHit, Width * sizeof(Pointer));
           ItemHit := nil;
         end;
       end;

function THitBMP.GetByte(x, y: integer): byte;
       begin
         {if (x >= 0) and (x < width) and (y >= 0) and (y < Height) then}
           result := ItemHit^[x]^[y];
       end;

procedure THitBMP.SetByte(x, y: integer; value: byte);
       begin
         {if (x >= 0) and (x < width) and (y >= 0) and (y < Height) then}
           ItemHit^[x]^[y] := value;
       end;

procedure THitBMP.MatrixCopy(bmpn:TBitmap; Posx, Posy:integer;
                                   Color: TColor; cmd: byte);
       var x,y :integer;
       begin
         for y := 0 to bmpn.Height - 1 do
         begin
           for x := 0 to bmpn.Width - 1 do
           begin
             if bmpn.Canvas.Pixels[x, y] <> Color then
             begin
               if (x + PosX < Width) and (y + PosY < Height) then
                 Bytes[x + PosX, y + PosY] := cmd;
             end;
           end;
         end;
       end;

procedure THitBMP.DoButtonUp;
       begin
         if ButtonDown <> nil then
         begin
           with ButtonDown do
           begin
             BtnUp;
             DrawNow(iImage.Picture.Bitmap, iBMPx, iBMPy, iBMPw, iBMPh);
           end;
           ButtonDown := nil;
         end;
       end;
```

49

```
      procedure THitBMP.HitCommand(cmd: byte);
      begin
        if Assigned(HitProc) then
          HitProc(cmd);
      end;

function THitBMP.GetTBMP(cmd: byte): TBMP;

function GetBMP(list: TList): TBMP;
10      var x: integer;
        begin
          result := nil;
          if list <> nil then
          begin
15          for x := 0 to List.count - 1 do
              if TBMP(list.Items[x]).iIndex = cmd then
              begin
                result := TBMP(list.Items[x]);
                break;
20            end;
          end;
        end;

begin
25      result := GetBMP(BMPList1);
        if result = nil then
          result := GetBMP(BMPList2);
      end;

30    procedure THitBMP.MouseDown(x,y: integer);
      var p: byte;
          t: TBMP;
      begin
        DoButtonUp;
35      if (x >= 0) and (x < width) and (y >= 0) and (y < height) then
        begin
          p := Bytes[x, y];
          if (p <> SysCmdNoop) then
          begin
40          t := GetTBMP(p);
            if (t <> nil) and (t.iBMPStatus <> BSDisabled) then
            begin
              if t.iBMPCount = 1 then
              begin
45              HitCommand(p)
              end
              else
              begin
                if t.iBMPType = BTStayDown then
50                HitCommand(p)
                else
```

```
                    t.BtnDown;
                end;
              end;
            end;
 5        end;
        end;

procedure THitBMP.MouseUp(x, y:integer);
        var p:byte;
10          t: TBMP;
        begin
          if ButtonDown <> nil then
            begin
              DoButtonUp;
15            p := ItemhitBMP.bytes[x, y];
              t := GetTBMP(p);
              if (t <> nil) and (t.iBMPStatus <> BSDisabled) and
                 (p <> SysCmdNoop) then
                HitCommand(p);
20          end;
        end;

procedure THitBMP.MouseMove(x, y:integer);
        begin
25        if (x >= 0) and (x < width) and (y >= 0) and (y < height) then
            if ButtonIndex <> ItemHitBMP.Bytes[x, y] then DoButtonUp;
        end;

{TBMP}
        constructor TBMP.Create;
        begin
          TObject.Create;
        end;

35      destructor TBMP.Destroy;
        begin
          {if iHitBMP <> nil then
          begin
            with iHitBMP do
40            if ButtonDown = self then ButtonDown := nil;
          end;}
          if iBMPOld <> nil then iBMPOld.destroy;
          if iBMPRestore <> nil then iBMPRestore.destroy;

          inherited destroy;
        end;

procedure TBMP.DrawNow(bmp: tBitmap; x, y, w, h:integer);
        var r: TRect;
        begin
```

```
            with iImage do
            begin
              if parent.showing then
              begin
                r := Rect(x, y, w + x - 1, h + y - 1);
                InvalidateRect(parent.handle, @r, false);
                UpdateWindow(parent.handle);
              end;
            end;
          end;

function TBMP.GetImageDC: THandle;
          begin
            result := iImage.Picture.Bitmap.Canvas.handle;
          end;

function TBMP.AddBMP(index:integer; nme:pChar;
            count: integer; image: TImage; HitBMP: THitBMP):boolean;
          var x, c: integer;
              tp, tpWin:TBitmap;
              str: array [0..255] of char;
              cnt: integer;
              w, h: integer;

function dim(i: integer):integer;
            begin
              if i = 0 then result := 1
                      else result := i * (iBMPSize shr 2) div 25;
            end;

function GetInt: integer;
            var i: integer;
            begin
              inc(cnt);
              GetIntToken(str, count, cnt, i);
              result := i;
            end;

begin
            iHitBMP := HitBMP;
            iImage := Image;
            result := false;
            cnt := 0;
            if nme <> nil then
            begin
              GetString(Style, nme, @str, 255);
              if isString(str) then
              begin
                iBMPParent := GetStyleBitmap;
```

52

```
              iBMPMaskColor := StyleMask;
            end
            else
            begin
 5            GetString(SecDefault, nme, @str, 255);
              iBMPParent := GetDefaultBitmap;
              iBMPMaskColor := DefaultMask;
            end;
            if isString(str) then
10            begin
        { x, y, %, BUTTON = 0/ICON = 1, w, h, # of versions (1 or 2),x1, y1, x2,
        y2}
              iBMPx := GetInt;
              iBMPy := GetInt;
15            iBMPSize := GetInt;
              iBMPType := GetInt;
              w := GetInt;
              h := GetInt;
              iBMPw := dim(w);
20            iBMPh := dim(h);
              iBMPCount := GetInt;

with iBMPList[BSUp] do
              begin
25              x := GetInt;
                y := GetInt;
              end;

if iBMPCount > 1 then
30              with iBMPList[BSDown] do
                begin
                  x := GetInt;
                  y := GetInt;
                end;
35
              if iBMPCount > 2 then
                with iBMPList[BSDisabled] do
                begin
                  x := GetInt;
40                y := GetInt;
                end;

if iBMPSize = 0 then iBMPSize := 100;
45          end;
            with iImage do
            begin
              if iBMPx < 0 then
                iBMPx := width + iBMPx;
50            if iBMPy < 0 then
                iBMPy := height + iBMPy;
```

```
          end;
          if str[0] <> chr(0) then
          begin
            if iBMPParent <> nil then
 5          begin
              tpWin := iImage.Picture.Bitmap;

iBMPOld := CreateCopy(tpWin, iBMPx, iBMPy, iBMPw, iBMPh);

10            with iBMPList[BSUp] do
                tp := CreateCopy(iBMPParent, x, y, w, h);

if tp <> nil then
              begin
15              MaskCopy(tpWin.canvas, rect(iBMPx, iBMPy, iBMPx+iBMPw-1,
          iBMPy+iBMPh-1),
                         tp, rect(0, 0, w-1, h-1), iBMPMaskColor, false);
                HitBMP.MatrixCopy(tp, iBMPx, iBMPy, iBMPMaskColor, index);
                DrawNow(tpWin, iBMPx, iBMPy, w, h);
20
                result := true;
                tp.Destroy;
              end;
            end;
          end;
          end;
        end;

procedure TBMP.DrawBitmap(Status: TBMPStatus; draw: boolean);
30      var BMPSave, BMPNew, BMPMask, BMPWin: TBitmap;
            dc, dcMono: THandle;
            hMono, hOldBMP, hOldMask: THandle;

function MergeBMP(SourceBMP: TBitmap; pt: TPoint):TBitmap;
35        begin
            result := CreateCopy(iBMPOld, 0, 0, iBMPw, iBMPh);

with pt, SourceBMP do
              MaskCopy(result.Canvas, rect(0, 0, iBMPw, iBMPh),
40                     SourceBMP, rect(x, y, x + iBMPw, y + iBMPh),
                       iBMPMaskColor, false);
          end;

begin
45        BMPMask := nil;
          BMPSave := nil;
          BMPNew := nil;

BMPWin := iImage.Picture.Bitmap;
50
          if iBMPRestore = nil then
```

54

```
        iBMPRestore := CreateCopy(BMPWin, iBMPx, iBMPy, iBMPw, iBMPh);

BMPMask := CreateCopy(BMPWin, iBMPx, iBMPy, iBMPw, iBMPh);

BMPSave := MergeBMP(iBMPParent, iBMPList[BSUp]);
        BMPNew := MergeBMP(iBMPParent, iBMPList[Status]);

BitBlt(BMPMask.canvas.handle, 0, 0, iBMPw, iBMPh,
                BMPSave.canvas.handle, 0, 0, $990066);

SetTextColor(BMPMask.canvas.handle, $0);
        SetBkColor(BMPMask.canvas.handle, $FFFFFF);

hMono := CreateBitmap(iBMPw, iBMPh, 1, 1, nil);
        dcMono := CreateCompatibleDC(0);
        hOldBmp := SelectObject(dcMono, hMono);

BitBlt(dcMono, 0, 0, iBMPw, iBMPh,
                BMPMask.canvas.handle, 0, 0, SRCCOPY);

BitBlt(BMPMask.canvas.handle, 0, 0, iBMPw, iBMPh,
                BMPNew.canvas.handle, 0, 0, SRCCOPY);

BitBlt(BMPMask.canvas.handle, 0, 0, iBMPw, iBMPh,
                dcMono, 0, 0, MERGEPAINT);

BitBlt(BMPWin.Canvas.handle, iBMPx, iBMPy, iBMPw, iBMPh,
                dcMono, 0, 0, SRCPAINT);

BitBlt(BMPWin.Canvas.handle, iBMPx, iBMPy, iBMPw, iBMPh,
                BMPMask.canvas.handle, 0, 0, SRCAND);

if Draw then
          DrawNow(BMPWin, iBMPx, iBMPy, iBMPw, iBMPh);

SelectObject(dcMono, hOldBmp);
        DeleteDC(dcMono);
        DeleteObject(hMono);

if BMPSave <> nil then
          BMPSave.Destroy;
        if BMPNew <> nil then
          BMPNew.Destroy;
        if BMPMask <> nil then
          BMPMask.Destroy;
      end;

procedure TBMP.BtnDown;
      begin
        if iHitBMP <> nil then
```

```
            iHitBMP.DoButtonUp;

if TBMPStatus(iBMPCount) > BSDown then
         begin
            if (iHitBMP <> nil) and (iBMPType <> BTStayDown) then
            begin
               with iHitBMP do
               begin
                  ButtonDown := self;
                  ButtonIndex := iIndex;
               end;
            end;
            DrawBitmap(BSDown, true);
            iBMPStatus := BSDown;
         end;
      end;

procedure TBMP.BtnUp;
      begin
         if iBMPRestore <> nil then
         begin
            BitBLT(ImageDC, iBMPx, iBMPy, iBMPw, iBMPh,
                   iBMPRestore.canvas.handle, 0, 0, SRCCOPY);

iBMPRestore.Destroy;
            iBMPRestore := nil;

if iHitBMP <> nil then
            begin
               with iHitBMP do
               begin
                  if ButtonDown = self then ButtonDown := nil;
                  if ButtonIndex = iIndex then ButtonIndex := SysCmdNoop;
               end;
            end;
            iBMPStatus := BSUp;
         end;
      end;

procedure TBMP.BtnDelete;
      begin
         BtnUp;
         if iBMPOld <> nil then
         begin
            BitBlt(ImageDC, iBMPx, iBMPy, iBMPw, iBMPh,
                   iBMPOld.canvas.handle, 0, 0, SRCCOPY);
         end;
      end;

procedure TBMP.BTNSave;
      begin
```

```
    BtnUp;
    iBMPRestore := CreateCopy(iImage.Picture.Bitmap, iBMPx, iBMPy, iBMPw,
  iBMPh);
  end;

procedure TBMP.BTNRestore;
  begin
    BtnUp;
  end;

procedure TBMP.BTNDisable;
  var tpMask, tpWin: TBitmap;
      dc, dcMono: THandle;
      hMono, hOldBMP, hOldMask: THandle;
  begin
    BtnUp;

if TBMPStatus(iBMPCount) > BSDisabled then
      DrawBitmap(BSDisabled, false)
    else if TBMPStatus(iBMPCount) > BSDown then
      DrawBitmap(BSDown, false);

iBMPStatus := BSDisabled;
  end;

{TUser}
  procedure TUser.SaveData;
  var oldRec: LongInt;
      fldData: array[0..3] of char;
  begin
    fldData[0] := #0;
    with DataDb do
    begin
      oldRec := dbRecNo;
      if (item <> nil) and (item.iRecNo > 0) then
      begin
        NumName(fldData, fldData, MailPending, false);
        PutFormData(item.iRecNo, 'MailPending', fldData);
      end;
      dbGoRec(oldRec);
    end;
  end;

{TItem}
  constructor TItem.Create;
  begin
    TBMP.Create;
    iTag := StrAlloc(szTag + 1);
    iTag[0] := char(0);
    iName := StrAlloc(szBitmap + 5);
```

```
            iName[0] := char(0);
            iTitle := StrAlloc(szTitle + 1);
            iTitle[0] := char(0);
            iChanged := false;
          end;

destructor TItem.Destroy;
          begin
            StrDispose(iTag);
10          StrDispose(iName);
            StrDispose(iTitle);
            if MailBMP <> nil then
              MailBMP.Destroy;
            inherited destroy;
          end;

function TItem.Load(index:integer):boolean;
          var len:integer;
              str: array[0..128] of char;
20        begin
            result := false;
            if len <> 0 then
            begin
              with DataDB do
25            begin
                iIndex := index;
                iCatNo := cItem;
                iRecNo := dbRecNo;
                StrLCopy(str, dbGetData('CLASS'), 127);
30              if Str[0] <> chr(0) then
                  iCatNo := CatNo(str);
                StrLCopy(iTitle, dbGetData('TITLE'), szTitle - 1);
                result := true;
              end;
            end;
          end;

function TItem.Attach:boolean;
          var x:integer;
40        begin
            x := 0;
            with Itemlist do
            begin
              for x := 0 to Count - 1 do
45              if (TItem(Items[x]).iCatNo > iCatNo) then
                  break;

Insert(x, self);
              result := true;
            end;
          end;
```

```
{function TItem.Remove: boolean;
begin
  ItemList.Delete(iIndex - 1);
  result := true;
end;} function TItem.AddBitmap(index:integer):boolean;
var cno, cgrp, i, x, c: integer;
    str: pChar;
    st: string[20];
    done: boolean;
    rct: TRect;
const
    mailname: pChar = 'Mail000';
begin
  result := false;
  str := StrAlloc(256);
  strCopy(str, iName);
  if str <> nil then
  begin
  {All this stuff is to find the
   correct bitmap name}
    if str[0] = char(0) then
    begin
      cno := iCatNo;
      repeat
        x := 0;
        cgrp := 1;
        while x <> index do
        begin
          c := TItem(ItemList.Items[x]).iCatNo;
          while (c <> cItem) and (c <> cno) do c := CatPNo(c);
          if c = cno then cgrp := cgrp + 1;
          x := x + 1;
        end;
        done := AddBMP(index, CatName(cno), cgrp,
                      window.BMPLandscape, ItemHitBMP);
        cno := CatPNo(cno);
      until (cno = cItem) or (cno = 0) or done;

cno := iCatNo;
      done := false;
      x := 1;

if IsInCategory(iCatNo, cPerson) then
      begin
        MailBMP := TBMP.Create;
        with MailBMP do
        begin
          MailName[4] := chr(0);
          inc(MailNum);
```

59

```
                 NumName(MailName, MailName, MailNum, true);
                 done := AddBMP(index, MailName, 1,
                         window.BMPMail, MailHitBMP);
                 if done then
 5               begin
                   for i := 0 to StrLen(iTitle) do
                   begin
                     if iTitle[i] in [chr(0), ' '] then break;
                     str[i] := iTitle[i];
10                 end;
                   str[i] := chr(0);
                   with window.BMPMail.Picture.BitMap.Canvas do
                   begin
                     SetBKMode(handle, TRANSPARENT);
15                   rct := Rect(iBMPx + 5, iBMPy + 30,
                                 iBMPx + iBMPw - 5, iBMPy + iBMPh - 10);
                     DrawText(handle, str, -1,
                       rct,
                       DT_CENTER);
20                   if user.MailPending = 0 then
                       st := 'No'
                     else
                       st := GetNumPString(user.MailPending);
                     StrPCopy(str, ' new messages');
25                   {DrawText(handle, str, -1,
                       Rect(iBMPx + 5, iBMPy + 60,
                             iBMPx + iBMPw - 5, iBMPy + iBMPh - 10),
                         DT_CENTER);}
                   end;
30               end
                 else
                 begin
                   Destroy;
                   self.MailBMP := nil;
35               end;
               end;
             end;
           end;
           StrDispose(Str);
         end;
       end;

function TItem.AddUser;
       var User: TUser;
45         fldData: array[0..40] of char;
           i: integer;
       begin
         if IsInCategory(iCatNo, cPerson) then
         begin
50         User := TUser.Create;
           with User do
```

```
           begin
             Item := self;
             self.User := User;
             with DataDB do
 5             begin
                 dbGoRec(iRecNo);
                 GetFormData(iRecNo, fldPassword, '', fldData, 40);
                 Password := StrPas(fldData);
                 GetFormData(iRecNo, 'MailPending', '', fldData, 40);
10               Val(StrPas(fldData), MailPending, i);
               end;
             end;
             UserList.Add(User);
           end;
         end;

{TItemList} function TItemList.LoadItem(n: word; data: Pointer): Boolean;
         var Item: TItem;
         begin
           Item := TItem.create;
           with Item do
           begin
             Load(n);
             Attach;
           end;
         end;

         procedure AlbumZapItems;
         var i, x, y: integer;
         begin
           if ItemList <> nil then
           begin
             with ItemList do
             begin
               SetString(secDefault, fldItems, GetNumString(Itemlist.count));
               for i := Itemlist.count - 1 downto 0 do
               begin
                 with TItem(Itemlist.items[i]) do
                 begin
                   if (Window <> nil) and Window.visible then
                     BtnDelete;
                   Destroy;
                 end;
               end;
             end;
             ItemList.Destroy;
             ItemList := nil;
50         end;
```

```
                                                61
         if ItemHitBMP <> nil then
         begin
           with ItemHitBMP do
           begin
             ButtonDown := nil;
             for y := 0 to height - 1 do
             begin
               for x := 0 to width - 1 do
                 if Bytes[x, y] < maxItems then
                   Bytes[x, y] := SysCmdNoop;
             end;
           end;
         end;

if MailHitBMP <> nil then
         begin
           with MailHitBMP do
           begin
             ButtonDown := nil;
             for y := 0 to height - 1 do
             begin
               for x := 0 to width - 1 do
                 Bytes[x, y] := SysCmdNoop;
             end;
           end;
         end;

if UserList <> nil then
         begin
           for i := UserList.count - 1 downto 0 do
           begin
             with TUser(Userlist.items[i]) do
             begin
               SaveData;
               Destroy;
             end;
           end;
           UserList.Destroy;
           UserList := nil;
           CurrentUser := nil;
         end;
       end;

procedure ShowInfo(cmd: byte);
       var item: TItem;
       begin
         item := TItem(ItemHitBMP.GetTBMP(cmd));
         if item <> nil then
         begin
           with Window do
           begin
```

```
                  if InfoAlbum = nil then
                    InfoAlbum := THBInfoBox.Create(nil, nil,
                                                   nil, nil, nil,
                                                   nil, window.InfoPickList,
                                                   nil, nil, nil, nil,
                                                   nil, nil, nil, nil,
                                                   'Person', nil, nil, nil,
                                                   cDaily);

with InfoPanel, InfoAlbum do
                  begin
                    SetBounds(window.page.left + 10, window.page.top + 10, Width,
                Height);
                    InfoTitle.Caption := StrPas(item.iTitle);
                    LoadInstantList;
                    BringToFront;
                    Visible := true;
                  end;
                end;
                ItemShow := item;
              end;
            end;

function HideInfo: boolean;
            begin
              with Window.InfoPanel do
              begin
                if Visible then
                begin
                  Visible := false;
                end;
              end;
              result := true;
            end;

procedure AlbumLoadItems;
            begin
              ItemList := TItemList.Create;
              UserList := TUserList.Create;
              if ItemHitBMP <> nil then
                ItemHitBMP.BMPList2 := ItemList;
              if MailHitBMP <> nil then
                MailHitBMP.BMPList1 := ItemList;
              with ItemList do
              begin
                DataDB.RunQuery('TITLE', nil, nil, cAlbumItem, nil, nil, 0,
                                false, false,
                                LoadItem, nil);
              end;
            end;
```

62

```
        procedure AlbumShowItems;
        var x: integer;
        begin
          MailNum := 0;
          for x := 0 to itemlist.count - 1 do
          begin
            InitWindow.AddActivity;
            with TItem(ItemList.items[x]) do
            begin
              AddUser;
              AddBitmap(iIndex);
            end;
          end;
        end;
        procedure AlbumInit;
        var    st:array[0..31] of char;
        begin
          BMPWidth := window.ClientWidth;
          BMPHeight := window.ClientHeight;
          with window.BMPLandscape do
          begin
            left := 0;
            top := 0;
          end;

GetPrivateProfileString(SecDefault, fldName, nilChar,
                                  st, 31, iniFile);

          AlbumLoadItems;
        end;

procedure AlbumGetCat(st: PChar; var filter: integer);
        var t:TItem;
           no: Integer;
        begin
          no := 0;
          filter := 0;
          while no < itemList.Count do
          begin
            t := TItem(Itemlist.Items[no]);
            with t do
            begin
              inc(no);
              if strcomp(st, iTitle) = 0 then
              begin
                filter := iCatNo;
                break;
              end;
          end;
          end;
```

```
                end;

procedure AlbumGetName(var st: PChar; var no: integer; filter: integer);
            var t:TItem;

function IsType(c: integer): boolean;
              begin
                result := false;
                if (filter = 0) or (filter = c) then result := true
                else
                  while (c <> cItem) and (not result) do
                  begin
                    c := CatPNo(c);
                    if c = filter then result := true;
                  end;
              end;

begin
              st := nilChar;
              while no < itemList.Count do
              begin
                t := TItem(Itemlist.Items[no]);
                with t do
                begin
                  inc(no);
                  if IsType(iCatNo) then
                  begin
                    st := iTitle;
                    break;
                  end;
                end;
              end;
            end;
            procedure AlbumSelect(title, nameTitle: PChar; Album: THBAlbum);
            begin
              if CurrentAlbum <> nil then
                CurrentAlbum.SaveFormData;
              CurrentAlbum := Album;
              with Album do
              begin
                LoadItemList;
                if (Itemlist1 <> nil) and (ItemList1.itemindex < 0) then
                begin
                  ItemList1.itemindex := 0;
                  NeedUpdate := true;
                end;
                if DataRecord <= 0 then
                begin
                  ItemListChanged;
```

```
              end
            else
              LoadRecord(DataRecord);
            NeedUpdate := false;
          end;
          SelectPage('Album', nil, true);
          UpdateTitle(StrPas(title));
          Window.ItemTitle.Caption := StrPas(nameTitle);
        end;

procedure AlbumRemove;
        begin
          if (PForm <> nil) and (PPanel <> nil) then
          begin
            PPanel.Parent := PForm;
            PForm.Release;
            PPanel := nil;
            PForm := nil;
          end;
        end;

procedure AlbumAttach(const pgename: string; Form: TForm; Panel: TPanel;
                              const title: string; AutoDestroy: boolean);
        var i: integer;
        begin
          if (PForm <> Form) or (PPanel <> Panel) then
          begin
            Panel.visible := false;
            with window.page do
              begin
                for i := 0 to pages.count - 1 do
                begin
                  if pages[i] = pgename then
                    break;
                end;
                with Panel do
                begin
                  Parent := (TPage(Pages.Objects[i]));
                  BringToFront;
                  Visible := true;
                end;
              end;
            SelectPage(pgename, nil, true);
            AlbumRemove;
            if AutoDestroy then
            begin
              PPanel := Panel;
              PForm := Form;
            end;
          end;
          UpdateTitle(title);
```

66

```
      end;

procedure LandScapeSysCommand(cmd: byte);
      const
          SysOrder: array[1..maxViews] of byte =
            (SysCmdFamily, SysCmdVehicles, SysCmdFinance, SysCmdAssets,
             SysCmdEmergency, SysCmdReport, SysCmdMail, SysCmdFind,
             SysCmdAddress, SysCmdToDo, SysCmdCalendar, SysCmdHome);
      var
          OldLSView, ViewIndex, i: integer;
          OldAlbum: THBAlbum;
          DontRemove: boolean;

procedure CalcViewIndex;
          var i: integer;
          begin
            for i := 1 to maxViews do
              if SysOrder[i] = LSView then break;
            ViewIndex := i;
          end;

begin
        DontRemove := false;
        if cmd < maxItems then
          ShowInfo(cmd)
        else
        begin
          HideInfo;
          if (not LSDisabled) or LSIsBasicCommand(cmd) then
          begin
            CurrentAlbum := nil; {stop any events ...}
            case cmd of
              SysCmdNext:      begin
                                 CalcViewIndex;
                                 inc(ViewIndex);
                                 if ViewIndex > maxViews then ViewIndex := 1;
                                 LandscapeSysCommand(SysOrder[ViewIndex]);
                               end;
              SysCmdPrev:      begin
                                 CalcViewIndex;
                                 dec(ViewIndex);
                                 if ViewIndex < 1 then ViewIndex := maxViews;
                                 LandscapeSysCommand(SysOrder[ViewIndex]);
                               end;
              SysCmdHelp:      {nothing yet};
              SysCmdExit:      if ResetScreen then
                               begin
                                 OldAlbum := CurrentAlbum;
                                 CurrentAlbum := nil;
                                 isAlive := false;
                                 OpenDlgExit;
```

67

```
                                    CurrentAlbum := OldAlbum;
                                    isAlive := true;
                                  end;
                SysCmdClose:      if ResetScreen then
                                  begin
                                    isAlive := false;
                                    OpenDlgClose;
                                    isAlive := true;
                                  end;
                SysCmdLogout:     PickUser;
              else
                if LSView <> cmd then
                begin
                  oldLSView := LSView;
                  LandScapeSelectView(cmd);
                  case cmd of
                    SysCmdHome:     SelectPage('', nil, false);
                    SysCmdFamily:   AlbumSelect('Family', 'Family Member',
            FamilyAlbum);
                    SysCmdVehicles: AlbumSelect('Vehicle','     Vehicle',
            VehicleAlbum);
                    SysCmdFinance:  AlbumSelect('Finance','Family Member',
            FinanceAlbum);
                    SysCmdAssets:   AlbumSelect('Assets', '        Home',
            AssetsAlbum);
                    SysCmdAddress:  SelectPage('Address', nil, true);
                    SysCmdToDo:
                      begin
                        HBCalendar.SetCalView(cvToDo);
                        SelectPage('Calendar', ToDoAlbum, true);
                        UpdateTitle('ToDo');
                      end;
                    SysCmdCalendar:
                      begin
                        HBCalendar.SetCalView(cvCalendar);
                        SelectPage('Calendar', nil, true);
                      end;
                    SysCmdFind:     SelectPage('Find', FindAlbum, true);
                    SysCmdReport:
                      begin
                        DontRemove := true;
                        ReportForm := TReportForm.Create(nil);
                        AlbumAttach('Report', ReportForm,
                          ReportForm.Panel, '', true);
                      end;
                    SysCmdEmergency:
                      begin
                        DontRemove := true;
                        HB911Rpt := THB911Rpt.Create(nil);
                        AlbumAttach('Emergency', HB911Rpt,
                          HB911Rpt.Main911Panel, '', true);
```

```
              end;
            SysCmdMail: SelectPage('Mail', nil, true);
          end;
          if not (LSIsBasicCommand(cmd) or Dontremove) then
            AlbumRemove;
        end;
      end;
    end;
  end;
end;

procedure LandscapeOuterFrame;
var nbmp: TBitmap;
begin
  nbmp := TBitmap.Create;
  if nbmp <> nil then
  begin
    nbmp.handle := LoadBitmap(hInstance, 'OUTER_FRAME');
    DrawFrame(window.BMPLandscape, nBmp);
    nbmp.destroy;
  end;
end;

procedure LandscapeInnerFrame;
var nbmp: TBitmap;
    w: integer;
begin
  nbmp := TBitmap.Create;
  if nbmp <> nil then
  begin
    nbmp.handle := LoadBitmap(hInstance, 'INNER_FRAME');
    w := nbmp.width;
    with window.PanelFrame do
    begin
      SetBounds(window.page.left - w,
                window.page.top - w,
                window.page.width + w * 2,
                window.page.height + w * 2);
    end;
    with window.BMPFrame do
    begin
      SetBounds(0,
                0,
                window.page.width + w * 2,
                window.page.height + w * 2);
      picture.bitmap.width := width;
      picture.bitmap.height := height;
    end;
    DrawFrame(window.BMPFrame, nBmp);
    nbmp.destroy;
  end;
```

```
        end;

function LSIsBasicCommand(c: byte): boolean;
        begin
          result := c in [SysCmdLogout, SysCmdExit, SysCmdClose, SysCmdHelp]
        end;

function LSIsBtnDown(t: TItem): boolean;
        var i:integer;
        begin
          result := false;
          for i := 0 to BtnList.count - 1 do
          if TBMP(BtnList.Items[i]).iBMPType = BTStayDown then
          begin
            with TBMP(BtnList.Items[i]) do
            begin
              if (iBMPRestore <> nil) and (iIndex = t.iIndex) then
                result := true
              else
                TBMP(BtnList.Items[i]).BtnUp;
            end;
          end;
          if not result then t.BtnDown;
        end;
        procedure LandScapeSelectView(p: byte);
        var t: TItem;
            dc: THandle;
            pnt: boolean;
        begin
          t := TItem(ItemHitBMP.GetTBMP(p));

if t <> nil then
          begin
            LSView := p;
            if t.iBMPType = 3 then
              LSisBtnDown(t);
            pnt := true;
            if LSFrame = nil then
            begin
              LSFrame := TFrame.Create(window.BMPLandscape);
              with LSFrame do
              begin
                parent := window;
                fFrameWidth := FrameWidth;
                BringToFront;
              end;
              pnt := false;
            end;
            with LSFrame, t do
            begin
```

70

```
            visible := false;
            SetBounds(window.BMPLandscape.left + iBMPx - FrameWidth,
                     window.BMPLandscape.top + iBMPy - FrameWidth,
                     iBMPw + FrameWidth * 2, IBMPh + FrameWidth * 2);
            visible := true;
            if pnt then  {don't paint the first time around - not initilized}
            begin
              dc := GetDC(handle);
              Paint(dc);
              ReleaseDC(handle, dc);
            end;
            window.BMPLandscape.repaint;
          end;
          SpeedbarButtonDown(p);
        end;
    end;

procedure BMPInit(bmp: TBitmap);
    var nbmp: TBitmap;
        hdcSrc, hdcDest, hBitmap:THandle;
        Bitmap: WinTypes.TBitmap;
        x,y: integer;

begin
      with bmp do
      begin
        Width := BMPWidth;
        Height := BMPHeight;
      end;

hdcDest := CreateCompatibleDC(0);
      SelectObject(hdcDest, bmp.handle);

hBitmap := LoadBitmap(hInstance, 'DeskPattern');
      hdcSrc := CreateCompatibleDC(0);
      SelectObject(hdcSrc, hBitmap);

GetObject(hBitmap, SizeOf(Bitmap), @Bitmap);

y := 0;
      with bitmap do
      begin
        while y < bmp.height do
        begin
          x := 0;
          while x < bmp.width do
          begin
            BitBlt(hdcDest, x, y, bmp.width, bmp.height,
                   hdcSrc, 0, 0, SRCCOPY);
            x := x + bmwidth;
          end;
```

71

```
            y := y + bmheight;
          end;
        end;

DeleteDC(hdcSrc);
        DeleteDC(hdcDest);
        DeleteObject(hBitmap);

end;

procedure LSButtonDisable;
      var x: integer;
      begin
        {LandscapeSysCommand(SysCmdHome);}
        if LSFrame <> nil then
        begin
          LSFrame.Destroy;
          LSFrame := nil;
        end;
        with BtnList do
          for x := 0 to Count - 1 do
          begin
            with TBMP(Items[x]) do
              if not LSIsBasicCommand(iIndex) then
                TBMP(Items[x]).BTNDisable;
          end;
        Window.Menu := InitMenu;
        Window.BMPLandscape.Repaint;
        LSDisabled := true;
      end;

procedure LSButtonEnable;
      var x: integer;
      begin
        LSDisabled := false;
        with BtnList do
          for x := 0 to Count - 1 do TBMP(Items[x]).BTNRestore;
        Window.Menu := WMenu.Menu{MainMenu};
        Window.BMPLandscape.Repaint;
      end;

procedure LSButtonExit;
      var x:integer;
      begin
        if BtnList <> nil then
        begin
          with BtnList do
          begin
            for x := 0 to Count - 1 do
              TBMP(Items[x]).Destroy;
```

```
            Destroy;
          BtnList := nil;
        end;
      end;
    end;

procedure LSButtonInit;

procedure BtnAdd(st: pChar; index: integer);
      var tb:TBMP;
      begin
        tb := TBMP.Create;
        tb.iIndex := index;
        tb.AddBMP(index, st, 1, window.BMPLandscape, ItemHitBMP);
        BtnList.Add(tb);
      end;

begin
      LSButtonExit;
      BtnList := TItemList.Create;
      if BtnList <> nil then
        begin
          BtnAdd('BtnLeftTop', SysCmdPrev);
          BtnAdd('BtnRightTop', SysCmdNext);
          BtnAdd('BtnLeftBottom', SysCmdLogout);
          BtnAdd('BtnRightBottom', SysCmdHelp);

BtnAdd('BtnFamily', SysCmdFamily);
          BtnAdd('BtnVehicles', SysCmdVehicles);
          BtnAdd('BtnFinance', SysCmdFinance);
          BtnAdd('BtnAssets', SysCmdAssets);
          BtnAdd('BtnCalendar', SysCmdCalendar);
          BtnAdd('BtnToDo', SysCmdToDo);
          BtnAdd('BtnHome', SysCmdHome);
          BtnAdd('BtnAddress', SysCmdAddress);

BtnAdd('BtnFind', SysCmdFind);
          BtnAdd('BtnReport', SysCmdReport);
          BtnAdd('BtnEmergency', SysCmdEmergency);
          BtnAdd('BtnMail', SysCmdMail);

end;
    end;

procedure LandscapeExit;
    var x,y: integer;
    begin
```

73

```
              if LSFrame <> nil then
              begin
                LSFrame.Destroy;
                LSFrame := nil;
              end;
              if ItemHitBMP <> nil then
              begin
                ItemHitBMP.Destroy;
                ItemHitBMP := nil;
              end;
            end;

procedure LandscapeInit;
            var str, s:pChar;
                hdcSrc, hdcDest: THandle;
                lbmp:TBitmap;
            begin
              Window.Repaint;
              LandscapeExit;
              LandscapeInnerFrame;
              str := StrAlloc(szBitmap + 5);
              if str <> nil then
              begin
                if style[1] = ' ' then {never initilized}
                   GetPrivateProfileString(SecDefault, fldStyle, StyleDefault,
                                           Style, szTag, iniFile);
                if desktop[1] = ' ' then
                   GetPrivateProfileString(SecDefault, fldDesktop, DesktopDefault,
                                           Desktop, szTag, iniFile);

if GetString(Style, fldLandscape, str, szBitmap) <> 0 then
                with Window.BMPLandScape.Picture do
                begin
                  BMPInit(Bitmap);
                  s := GetBMPName(str, 1, 1);
                  if s <> nil then
                  begin
                    lbmp := TBitmap.Create;
                    with lbmp do
                    begin
                      LoadFromFile(StrPas(s));
                      if handle <> 0 then
                      begin
                        CenterWidth := graphic.width;
                        CenterHeight := graphic.height;
                        CenterXPos := 0;
                        CenterYPos := 0;
                        if width < CenterWidth then
                        begin
```

74

```
                    CenterXPos := (CenterWidth - width) div 2 - 1;
                    CenterWidth := width;
                  end;
                  if height < CenterHeight then
                  begin
                    CenterYPos := 10{(CenterHeight - height) div 2};
                    CenterHeight := height;
                  end;
                  hdcDest := CreateCompatibleDC(0);
                  SelectObject(hdcDest, TBitmap(graphic).handle);

hdcSrc := CreateCompatibleDC(0);
                  SelectObject(hdcSrc, handle);

                  BitBlt(hdcDest, CenterXPos, CenterYPos, CenterWidth,
          CenterHeight,
                         hdcSrc, 0, 0, SRCCOPY);

DeleteDC(hdcSrc);
                  DeleteDC(hdcDest);
                  TBitmap(Graphic).Palette := Palette;
                end;
               Destroy;
              end;
           end;
           window.repaint;
           with Window.BMPLandscape do
              ItemHitBMP := THitBMP.Create(width, height);
           AlbumShowItems;
           LandscapeOuterFrame;
           window.repaint;
           LSButtonInit;
           with ItemHitBMP do
           begin
              BMPList1 := BtnList;
              BMPList2 := ItemList;
              HitProc := LandscapeSysCommand;
           end;
          end;
         StrDispose(str);
       end;
     end;

var ExitSave: Pointer;
     procedure hbAlbumExit; far;
     begin
       ExitProc := ExitSave;
       ClrStyleBitmap;
       ClrDefaultBitmap;
       LSButtonExit;
```

```
    end;

initialization
      ExitSave := ExitProc;
      ExitProc := @hbAlbumExit;
    end.
```

76

```
        unit Hbcat;

interface
       uses SysUtils, wintypes, winprocs, hbutil;

type pHBitmap = ^HBitmap;
          TCategory = record
            No:   integer;
            pNo:  integer;
            Name: pChar;
            Title: pChar;
            Bitmap: tHandle;
          end;

const
          szTag = 20;
          szBitmap = 80;
          szTitle = 32;

strItem:      pChar = 'Item';
   cItem =       1000;
          cPerson =     2900;
          cAdult =      2200;
30        cWoman =      2100;
          cMan =        2000;
          cChild =      2500;
          cGirl =       2400;
          cBoy =        2300;
35        cToddler =    2450;
          cPet =        3900;
          cDog =        3100;
          cCat =        3200;
          cBird =       3300;
40        cVehicle =    4900;
          cCar =        4000;
          cMotorcycle = 4100;
          cBoat =       4200;
          cPlane =      4300;
45        cHouse =      5900;
          cHome =       5000;
          c2ndHome =    5100;

MaxCategory = 21;
          Category:array [1..MaxCategory] of TCategory =
```

77

```
         ((No: cItem;
           pNo: 0;
           Name: 'Item';
           Title: 'Tag'),
          (No: cMan;
           pNo: cAdult;
           Name: 'Man';
           Title: ''),
          (No: cWoman;
           pNo: cAdult;
           Name: 'Woman';
           Title: ''),
          (No: cAdult;
           pNo: cPerson;
           Name: 'Adult';
           Title: ''),
          (No: cChild;
           pNo: cPerson;
           Name: 'Child';
           Title: ''),
          (No: cBoy;
           pNo: cChild;
           Name: 'Boy';
           Title: ''),
          (No: cGirl;
           pNo: cChild;
           Name: 'Girl';
           Title: ''),
          (No: cToddler;
           pNo: cChild;
           Name: 'Toddler';
           Title: ''),
          (No: cPerson;
           pNo: cItem;
           Name: 'Person';
           Title: 'Firstname," ",Lastname'),
          (No: cDog;
           pNo: cPet;
           Name: 'Dog';
           Title: ''),
50
          (No: cCat;
```

78

```
              pNo: cPet;
              Name: 'Cat';
              Title: ''),
            (No: cBird;
              pNo: cPet;
              Name: 'Bird';
              Title: ''),
             (No: cPet;
              pNo: cItem;
              Name: 'Pet';
              Title: 'Name'),
             (No: cCar;
              pNo: cVehicle;
              Name: 'Car';
              Title: ''),
             (No: cMotorcycle;
              pNo: cVehicle;
              Name: 'Motorcycle';
              Title: 'Name'),
             (No: cBoat;
              pNo: cVehicle;
              Name: 'Boat';
              Title: 'Name'),
             (No: cPlane;
              pNo: cVehicle;
              Name: 'Plane';
              Title: 'Name'),
             (No: cVehicle;
              pNo: cItem;
              Name: 'Vehicle';
              Title: 'Brand, " ", Model, " ", Year'),
             (No: cHome;
              pNo: cHouse;
              Name: 'Home';
              Title: 'Name'),
             (No: c2ndHome;
              pNo: cHouse;
              Name: '2nd Home';
              Title: 'Name'),
             (No: cHouse;
              pNo: cItem;
```

```
             Name: 'House';
             Title: 'Name'));

function CatName(n:integer):pChar;
     function CatNo(Name:pChar):integer;
     function CatPNo(n:integer):integer;
     function CatPName(Name:pChar):pChar;
     function CatTitle(n:integer):pChar;
     function CatBMP(n:integer):THandle;
     function CatIndex(n:integer):integer;
     function CatItem(n:integer):integer;
     function IsInCategory(n, c: integer): boolean;

implementation

{$R FLINTSTN} function CatName(n:integer):pChar;
     var x:integer;
     begin
       result := nilChar;
       for x := 1 to MaxCategory do
         if n = Category[x].no then
         begin
           result := Category[x].Name;
           break;
         end;
     end;

function CatNo(Name:pChar):Integer;
     var x:integer;
     begin
       result := 0;
       for x := 1 to MaxCategory do
         if StrlComp(Name, Category[x].name, szTag) = 0 then
         begin
           result := Category[x].No;
           break;
         end;
     end;

Function CatPNo(n:integer):integer;
     var x:integer;
     begin
       result := 0;
       for x := 1 to MaxCategory do
         if Category[x].no = n then
         begin
```

80

```
            result := Category[x].pNo;
            break;
          end;
       end;
     end;

function CatPName(Name:PChar):PChar;
     var i:integer;
     begin
       i := CatPNo(CatNo(Name));
       if i = cItem then result := strItem
                   else result := CatName(i);
     end;

function CatTitle(n:integer):PChar;
     var x:integer;
     begin
       result := nilChar;
       repeat
         for x := 1 to MaxCategory do
         begin
           if n = Category[x].no then
           begin
             result := Category[x].Title;
             break;
           end;
         end;
         n := CatPNo(n);
       until (result[0] <> chr(0))
     end;

function CatBMP(n:integer):THandle;
     var x:integer;
     begin
       result := 0;
       repeat
         for x := 1 to MaxCategory do
         begin
           if Category[x].no = n then
           begin
             result := Category[x].Bitmap;
             break;
           end;
         end;
         if result = 0 then n := CatPNo(n);
       until (result <> 0) or (n = cItem);
     end;

function CatIndex(n:integer):integer;
     var x:integer;
     begin
       result := 0;
```

81

```
            for x := 1 to MaxCategory do
            begin
              if Category[x].no = n then
              begin
                result := x;
                break;
              end;
            end;
          end;

function CatItem(n:integer):integer;
          begin
            if n in [1..MaxCategory] then result := Category[n].no
                                    else result := cItem;
          end;

function IsInCategory(n, c: integer): boolean;
          begin
            result := false;
            repeat
              if n = c then
              begin
                result := true;
                break;
              end;
              n := CatPNo(n);
            until (n = 0) or (n = cItem);
          end;

var x:integer;
              ExitSave: Pointer;

procedure hbCatExit; far;
          begin
            ExitProc := ExitSave;
            for x := 1 to MaxCategory do
              if Category[x].Bitmap <> 0 then
                 DeleteObject(Category[x].Bitmap);
          end;

initialization
            for x := 1 to MaxCategory do
              Category[x].Bitmap :=
                LoadBitmap(hInstance, pChar(Category[x].no));
            ExitSave := ExitProc;
            ExitProc := @hbCatExit;
          end.
```

What is claimed is:

1. In a computer system having an application program for manipulating and representing user data, said user data pertaining to actual physical objects of a user and which exist outside the computer system in an environment of interest to the user, a data-centric method for assisting the user with operation of said application program, the method comprising:

displaying a background image comprising a pictorial representation of said environment of interest to the user;

displaying on said background at least one object image comprising a pictorial representation of a particular one of said physical objects of the user for providing access to user data pertaining to said particular one of said physical objects of the user, wherein the system is configurable such that the user can selectively place object images on the background image for modifying which physical objects of the user are represented by said environment;

receiving first user input for selecting a particular one of said at least one object image, for obtaining access to user data pertaining to the particular physical object of the user;

displaying, in response to said first user input, a list of user data pertaining to said particular physical object of the user;

receiving second user input for selecting a data item of interest from said list of user data pertaining to said particular physical object of the user; and launching execution of a particular portion of said application program for manipulating and representing said selected data item.

2. The method of claim 1, wherein said background image includes a bitmap landscape comprising a pictorial representation of said environment.

3. The method of claim 2, wherein said bitmap landscape comprises an image representing a family environment.

4. The method of claim 3, wherein said at least one object image includes a bitmap icon comprising a pictorial representation of a person.

5. The method of claim 4, wherein said particular object image selected is an image representing the user and wherein said list of user data pertaining to said particular physical object of the user comprises information pertaining to the user personally.

6. The method of claim 5, wherein said user data comprises at least health information and insurance information about the user.

7. The method of claim 3, wherein said at least one object image includes a bitmap icon comprising a pictorial representation of a vehicle, said vehicle being the particular physical object of the user.

8. The method of claim 7, wherein said list of user data pertaining to said particular physical object of the user comprises at least maintenance and insurance information pertaining to said vehicle.

9. The method of claim 3, wherein said at least one object image includes a bitmap icon comprising a pictorial representation of a person other than said user.

10. The method of claim 9, wherein said list of user data pertaining to said particular physical object of the user comprises personal information pertaining to said person other than said user.

11. The method of claim 9, wherein said person other than said user is a family member of said user.

12. The method of claim 3, wherein said at least one object image includes a bitmap icon comprising a pictorial representation of a house of the user.

13. The method of claim 12, wherein said list of user data pertaining to said particular physical object of the user comprises information pertaining to said house of the user.

14. The method of claim 13, wherein said user data comprises at least maintenance information and insurance information about said house of the user.

15. The method of claim 2, wherein said bitmap landscape comprises an image representing a business environment.

16. The method of claim 1, wherein said particular portion of said application program comprises a functional module of said application program designed for displaying and manipulating said selected data item.

17. The method of claim 1, further comprising:

displaying at least one launch icon for invoking various functional modules of said application program irrespective of data items selected by the user.

18. The method of claim 17, wherein said at least one launch icon is displayed at a location other than on said background image.

19. The method of claim 1, wherein said step of displaying a list of user data pertaining to said particular physical object of the user comprises displaying a browser for navigating user data pertaining to said particular physical object.

20. The method of claim 19, wherein said step of receiving second user input for selecting a data item of interest comprises:

receiving first input signals for positioning a screen cursor at a position on said list corresponding to where a specific item of said user data is located; and receiving second input signals for indicating user selection of a particular screen location, wherein said screen location is the position on said list corresponding to where said specific item of said user data is located.

21. A computer having an improved data-centric interface comprising:

a computer having a processor, a memory, and a screen display;

means for displaying on said screen display a background image comprising a pictorial image for modeling an environment of interest to a user and which exists outside of said computer;

means for displaying on said background image images of a user's own physical objects which exist in said environment, each physical object being an actual object of the user and being associated with particular user information;

means for storing user information; and means for providing access to the stored user information comprising:

an input device for selecting an image of one of said physical objects from said background image;

means for determining which user information is associated with the physical object whose image has been selected by the user; and means for providing access to the user information associated with the physical object whose image has been selected by the user by displaying a representation of user information which is associated with the physical object.

22. The system of claim 21, further comprising:

means for selecting particular user information from said representation of user information which is associated with the physical object; and means for launching execution of application program code for representing and manipulating the particular user information which has been selected.

23. The system of claim 21, wherein said background image which models an environment of interest to a user includes a bitmap image comprising a pictorial representation of the user's family and home environment.

24. The system of claim 23, wherein said images of objects which exist in said environment includes bitmap images comprising a pictorial representation of members of the user's family.

25. The system of claim 23, wherein said images of objects which exist in said environment includes bitmap images comprising pictorial representations of physical objects which the user owns.

26. The system of claim 25, wherein said bitmap images comprising pictorial representations of physical objects which the user owns include at least an image of a house and an image of a vehicle.

27. The system of claim 21, further comprising:
   means for interviewing the user for automatically selecting a background image which best models the environment which is of interest to a user.

28. The system of claim 21, wherein the environment which is of interest to a user is a family setting.

29. The system of claim 21, wherein the environment which is of interest to a user is a business setting.

30. The system of claim 21, wherein said system further comprises:
   means for switching said environment to a new type of environment, so that said background image and said images of objects are automatically updated to images which represent said new type of environment and objects which exist in said new type of environment.

31. The system of claim 30, wherein said means for switching includes means for switching from an environment which presents a family view of said user information to an environment which presents a financial view of said user information.

32. In an electronic mail system, a method for providing an improved interface for operating the system comprising:
   displaying an electronic mail interface for providing from a single computer electronic mail for multiple users of the single computer, the interface comprising a set of screen images each of which represents a user of the system, said system initially displaying the same set of screen images for the multiple users regardless of which particular user is currently logged onto the system;
   receiving user input for logging onto the system from a user who has previously established an electronic mail box with the system, whereupon said user from which said user input originates is accorded access as a user currently logged onto the system;
   receiving user input from said user currently logged onto the system for selecting one of said screen images, the selected screen image representing a particular user of the system;
   determining whether the user selecting one of said screen representations of a user of the system is the same as the particular user whose screen image has been selected;
   if the user of the system is the same as the particular user whose screen image has been selected, displaying an electronic mail box for the user currently logged onto the system, said electronic mail box including incoming messages to the user; and
   if the user of the system is not the same as the particular user whose screen image has been selected, displaying an input screen for creating an outgoing message from the user currently logged onto the system to the particular user whose screen image has been selected.

33. The method of claim 32, wherein the step of displaying screen images representing each user of the system comprises:
   displaying an image of a refrigerator having a plurality of notes attached to it, each note including a name for one of the users of the system.

34. The method of claim 32, further comprising creating an outgoing message to a user other than the one currently logged onto the system by:
   selecting a note for the other user, the note including the name for the other user; and
   displaying an editor for creating an outgoing message to the other user.

35. In a single computer system which is shared by a plurality of users, a method for controlling access to user information stored on said single computer system, the method comprising:
   displaying screen images representing each user of the system;
   receiving user input for logging onto the system, said user input specifying a user currently logged onto the system;
   receiving user input from said user currently logged onto the system for selecting one of said screen images, the selected screen image representing a particular user of the system;
   determining whether the user selecting one of said screen representations of a user of the system is the same as the particular user whose screen image has been selected;
   if the user of the system is the same as the particular user whose screen image has been selected, providing access to the user information for the user whose screen image has been selected; and
   if the user of the system is not the same as the particular user whose screen image has been selected, denying access to the user information for the user whose screen image has been selected.

36. The method of claim 35, further comprising:
   receiving user input from one user granting others access to at least some of that user's user information.

37. The method of claim 36, further comprising:
   receiving user input from said user currently logged onto the system for selecting one of said screen images, the selected screen image representing a particular user of the system;
   determining whether the user selecting one of said screen representations of a user of the system is the same as the particular user whose screen image has been selected;
   if the user of the system is the same as the particular user whose screen image has been selected, providing access to the user information for the user whose screen image has been selected;
   if the user of the system is not the same as the particular user whose screen image has been selected, determining whether the user has been granted access to at least some of the user information for the user whose screen image has been selected; and
   if the user of the system has been granted access to at least some of the user information for the user whose screen image has been selected, providing access to said at least some of the user information for the user whose screen image has been selected.

* * * * *